(12) United States Patent
Rudin et al.

(10) Patent No.: US 8,106,968 B1
(45) Date of Patent: Jan. 31, 2012

(54) SYSTEM AND METHOD FOR PATTERN DETECTION AND CAMERA CALIBRATION

(75) Inventors: Leonid I. Rudin, San Marino, CA (US); Pablo Musé, Pasadena, CA (US); Pascal Monasse, Paris (FR)

(73) Assignee: Cognitech, Inc., Pasadena, CA (US)

( * ) Notice: Subject to any disclaimer, the term of this patent is extended or adjusted under 35 U.S.C. 154(b) by 1016 days.

(21) Appl. No.: 12/034,596

(22) Filed: Feb. 20, 2008

(51) Int. Cl.
*H04N 5/217* (2011.01)
*G06K 9/00* (2006.01)
*G06K 9/46* (2006.01)
*G06K 9/40* (2006.01)

(52) U.S. Cl. ......... 348/241; 382/181; 382/190; 382/275

(58) Field of Classification Search ............... 348/241; 382/181, 190, 275
See application file for complete search history.

(56) References Cited

U.S. PATENT DOCUMENTS 7,280,706 B2 * 10/2007 Wu et al. ............. 382/275

* cited by examiner

*Primary Examiner* — William Choi
(74) *Attorney, Agent, or Firm* — Klein, O'Neill & Singh, LLP

(57) ABSTRACT

Detecting a pattern in an image by receiving the image of a pattern and storing the image in a memory, where the pattern is composed of shapes that have geometrical properties that are invariant under near projective transforms. In some embodiments the process detects shapes in the image using the geometrical properties of the shapes, determines the alignment of the various shapes, and, corresponds or matches the shapes in the image with the shapes in the pattern. This pattern detection process may be used for calibration or distortion correction in optical devices.

6 Claims, 19 Drawing Sheets

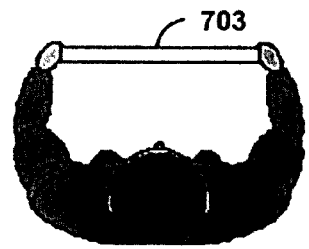
FIGURE 7A
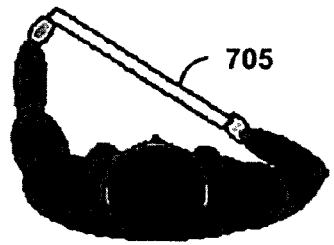
FIGURE 7B
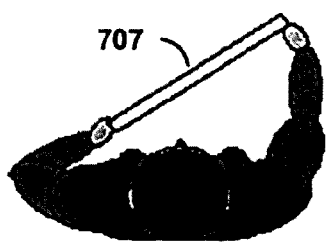
FIGURE 7C
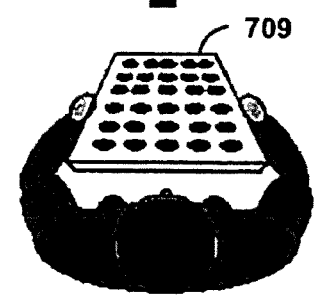
FIGURE 7D
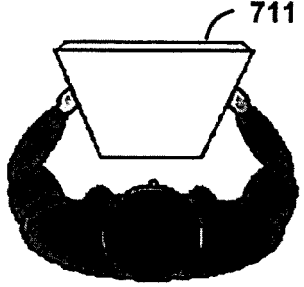
FIGURE 7E
FIGURE 7

SYSTEM AND METHOD FOR PATTERN DETECTION AND CAMERA CALIBRATION

BACKGROUND OF THE INVENTION

The present invention relates generally to image analysis, and more particularly to pattern detection and camera calibration.

Image analysis may be performed for a variety of reasons. One may wish to attain greater knowledge of what is disclosed by a particular image or set of images, for example whether an image or set of images includes particular persons or objects, or other information, and image analysis may be performed on the image or images to provide such information. One may also wish to categorize images by common features in the images, or other aspects of the images or which may be ascribed to the images.

In some instances it is also desirable to modify an image or set of images, usually preferably by enhancing the image or images in some way. For example, images may be modified by taking common actions to common features of images, for example setting a flesh color to a common level to obscure undesirable marks, to provide additional or different information over, for example, a portion of an image of a sports field. Image analysis may be useful in determining which portions of an image to modify, as well as possibly details relating to the modification.

Determining which portions of an image to modify, however, may be difficult, particularly if using automated machines or methods. Variations in image scenes, lighting, color, camera angle, and other details relating to images may make common processing of images difficult. In addition, images of similar features, or even the same feature, may vary, sometimes substantially, from camera to camera due to lens or other distortions.

BRIEF SUMMARY OF THE INVENTION

The present invention relates to image analysis, particularly pattern detection and camera calibration using pattern detection. Pattern detection may be implemented in a general purpose computer or in an embedded system, for example a digital camera or cellular handset including a camera. In an embodiment the invention may detect patterns of shapes in an image. The pattern may be held up in front of a digital camera, with the digital camera receiving an image of the pattern and storing the image of the pattern in a memory. The image is generally effectively a projective transform of the view seen by the camera, although in many instances the image may be properly considered a near projective transform of the view seen by the camera. Aspects of the present invention provide a process for detecting shapes in a pattern using geometrical-invariant properties of the shapes under a projective or near projective transformation.

One aspect of the invention provides a method of detecting a pattern in an image comprising receiving the image of a pattern and storing the image in a memory, where the pattern is composed of shapes that have geometrical properties that are invariant under near projective transforms; detecting the shapes in the image using the geometrical properties of the shapes; determining the alignment of the various shapes; and, corresponding the shapes in the image with the shapes in the pattern.

It should be noted that in various embodiments this process may be performed on any type of shape as long as there is a geometrical property of the shape that allows its detection in the image. Aspects of the present invention, for example pattern detection, may be used in applications such as calibration and distortion correction, 3D object recognition, distance measurements within an image using the optical device in a cellular handset or camera or any other optical device, image insertion in live video, or image insertion in film or pre-recorded video, 3D object tracking such as tracking an airplane, automobile, mobile equipment or any object that can fly. The pattern detection embodied in the present invention in some embodiments uses circles in the pattern because a circle becomes an ellipse under a near projective transform. Preferably an ellipse has known geometrical properties.

In one aspect the invention provides a method which receives an image and converts the image to a grey level format; extracts the level sets of the image; determines the ellipses among the shapes in the level sets; determines ringed ellipses among the ellipses; sorts the pattern and outputs a known pattern.

BRIEF DESCRIPTION OF THE DRAWINGS

FIGS. 7A, 7B, 7C, 7D, and 7E depict various angles that the optical device may receive an image of the pattern.

DETAILED DESCRIPTION

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
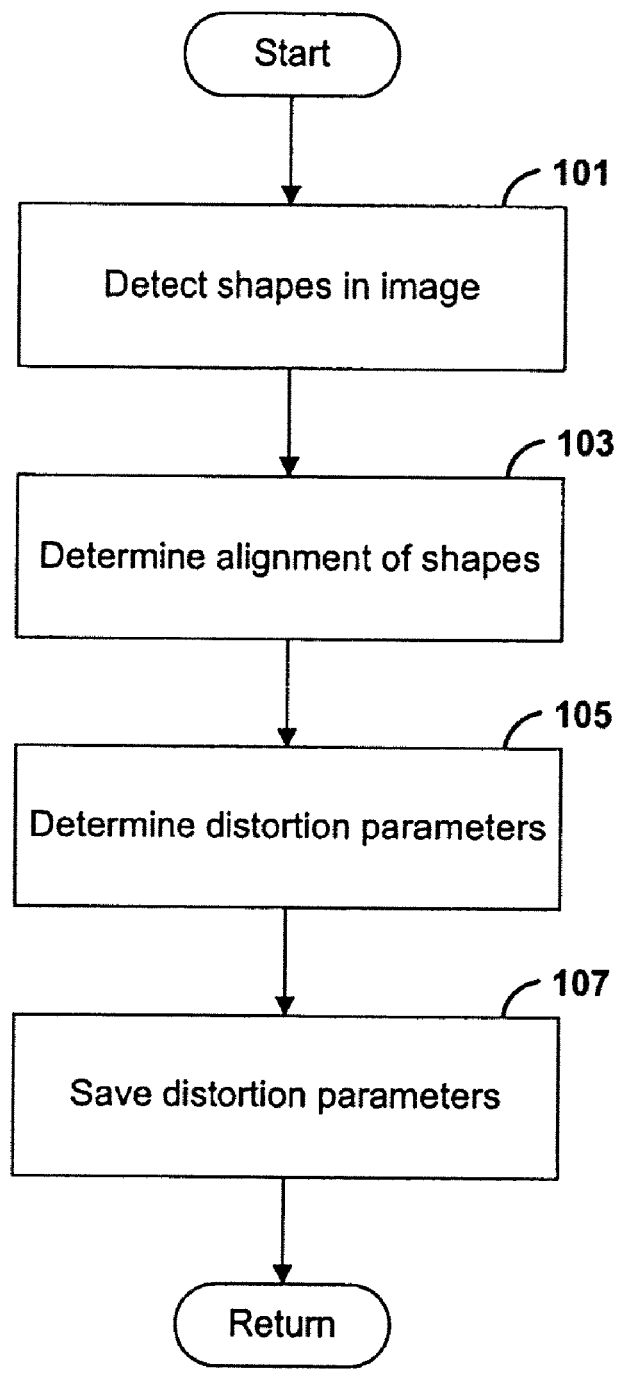
FIG. 1 is a logic flow diagram of a method showing one aspect of the present invention, for determining distortion parameters of an optical device.

FIG. 1 depicts a logic flow diagram of a method showing one aspect of the present invention, for determining distortion parameters of an optical device. In some embodiments the method is performed by a system or device later discussed with respect to FIGS. 9-11.

With reference to FIG. 1, in block 101 the process detects shapes in an image. In most embodiments the images are images of real world objects taken by one or more cameras. In one embodiment detecting shapes comprises using geometrical properties of the shapes in order to detect the shapes. For example, in some embodiments the process detects shapes by determining connected sets of pixels in the same or similar level sets. In some further embodiments the process further determines if shapes are detected by determining moments of shapes defined by the connected sets of pixels, with shapes being considered detected if the moments meet a predefined criteria, such as criteria for an expected shape or for similarity between shapes. In block 103 the process determines alignment of the shapes. In one embodiment, determining the alignment of the shapes comprises determining angles between centroids of the shapes. In block 105 the process determines distortion parameters. In some embodiments the process determines distortion parameters by comparing known expected relative centroid positions of the detected shapes with calculated centroid positions of the detected shapes. In some further embodiments the process iteratively determines distortion parameters for a plurality of images, each image being a different view of an item, with each successive iteration using distortion parameters calculated during an prior iteration. In block 107 the distortion parameters are saved. In one embodiment the distortion parameters may be saved in a Random Access Memory (RAM), a variant of RAM, an optical storage technology, a magnetic storage technology, hand written or printed on a piece of paper, mechanically stored, stored using a nano-technology, stored using any computer application running on a general personal computer, calculator or handheld device or optically stored on film, or electro-optically saved.

Figure 2:
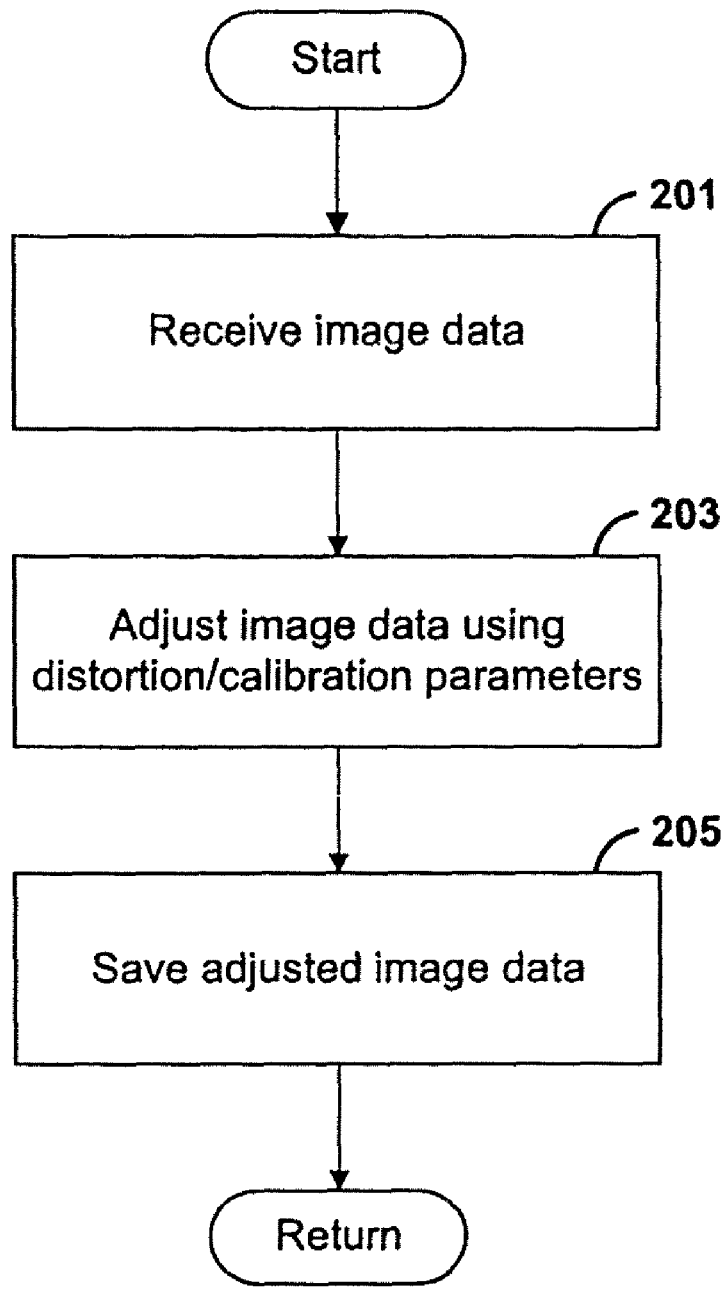
FIG. 2 is a logic flow diagram of a method showing one aspect of the present invention, for correcting an image using the distortion/calibration parameters.

FIG. 2 is a logic flow diagram of a method showing one aspect of the present invention, for correcting an image using the distortion/calibration parameters. In various embodiments the method is performed by hardware such as described with respect to FIGS. 9-11.

With reference to FIG. 2, in block 201 the process receives the image or image data. Image data herein refers also to the image. In block 203 the process adjusts the image using distortion and/or calibration parameters. In block 205 the adjusted image is saved, for example in computer accessible memory. In one embodiment the adjusted image is saved to a memory similar to the memory described above.

Figure 3:
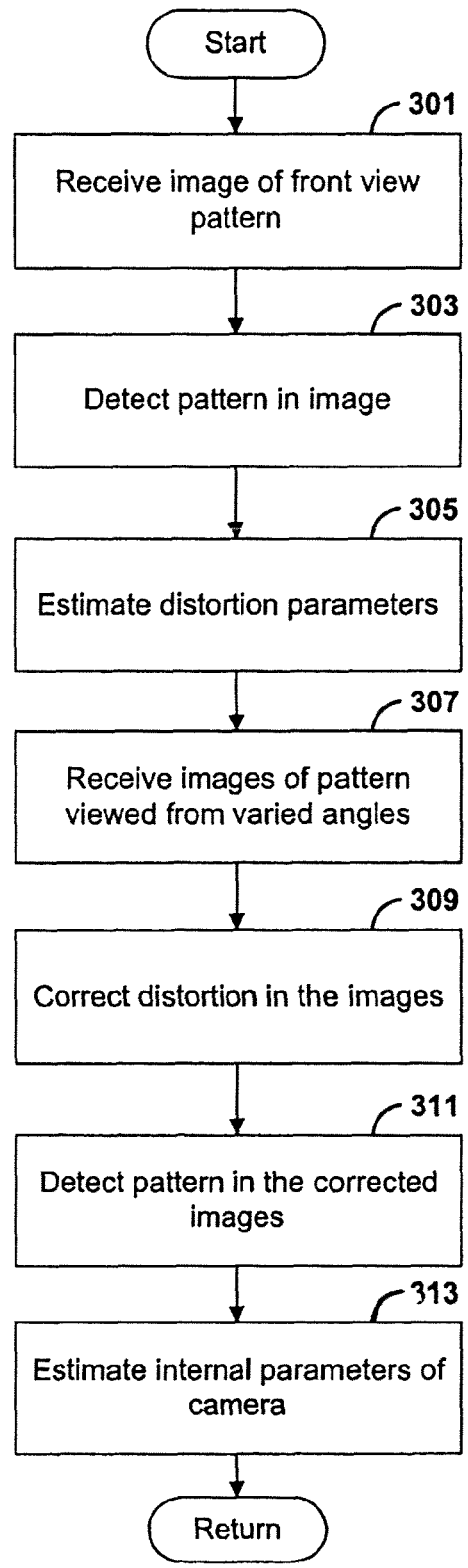
FIG. 3 is a logic flow diagram of a method showing one aspect of the present invention, for calibrating an optical device such as a digital camera.
Figure 6:
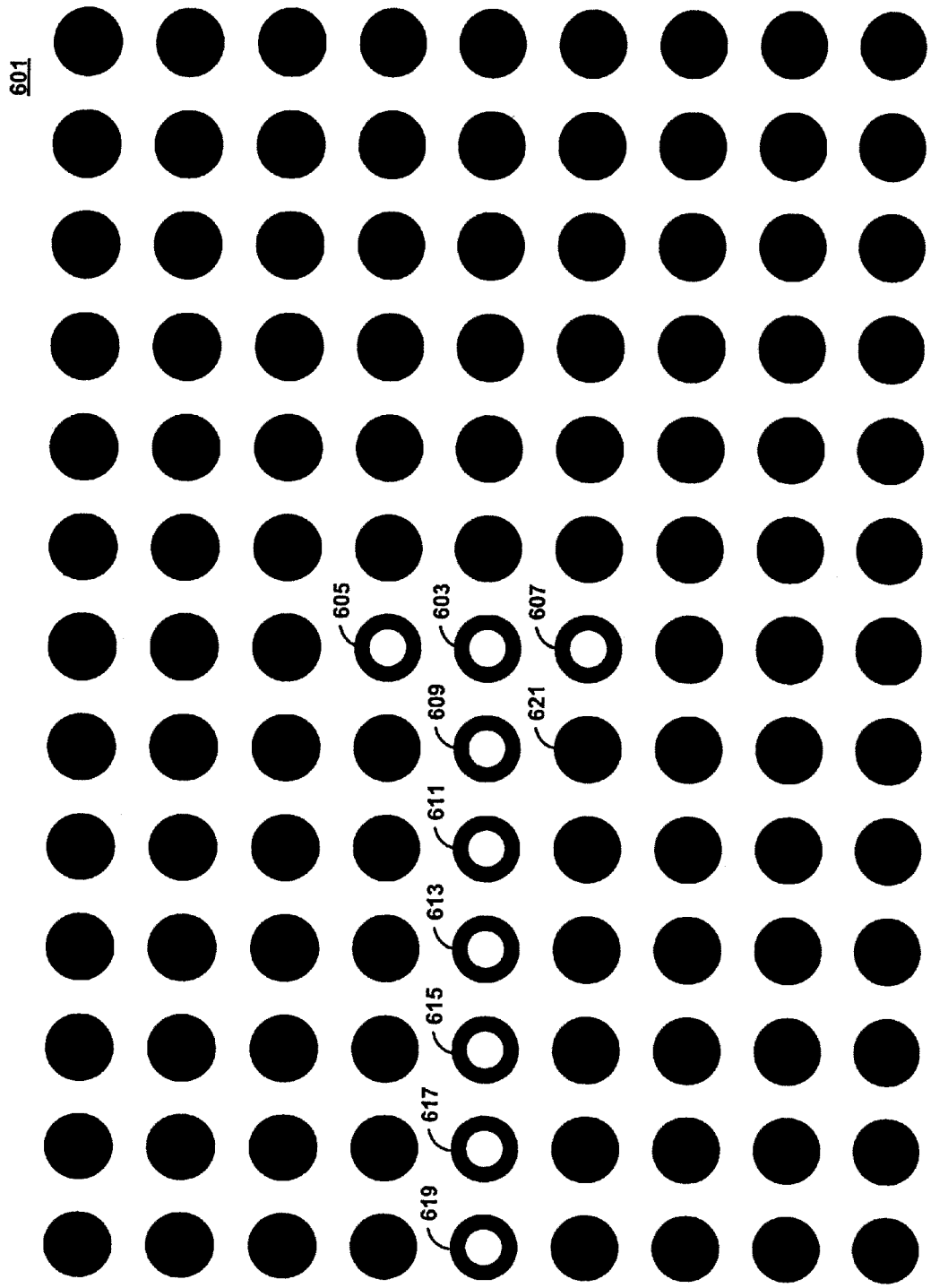
FIG. 6 depicts a pattern used for calibration in one aspect of the present invention.

FIG. 3 shows a flow chart of a process for calibrating an optical device. In one embodiment the optical device may be a camera such as a digital camera, camcorder, digital video camera, charged coupled device (CCD), optical lens, or camera embedded in a cellular handset. In block 301 the process receives an image of a front view of a pattern. In one embodiment receiving an image is accomplished by placing a pattern, for example a pattern such as shown in FIG. 6, in front of an optical device, using the optical device to form an image, and storing the image in memory, for example a memory of a computer or handheld optical device. In some embodiments, the pattern may be on an object held by a human or put on a stand in the front view of the camera, for example as depicted in FIG. 7A, and then taking a picture with the camera and storing pixels from a CCD of the camera in memory. In another embodiment, receiving an image is transferring an image of a pattern previously received by an optical device from a memory to another memory. In another embodiment, receiving an image is selecting an image of a pattern from a group of images previously received by an optical device. In another embodiment, receiving an image is selecting an image of a pattern that is a simulation image or computer generated image of an image of a pattern received by an optical device.

In block 303 the process detects the pattern in the image. In some embodiments the process detects the pattern by finding connected sets of pixels with similar gray scale values and determining if the connected sets of pixels meet a predefined criteria. In block 305 the process estimates distortion parameters. In some embodiments the process estimates distortion parameters by comparing expected positions of pixels of the pattern with detected positions of pixels of the pattern. In block 307 the process receives images of the pattern from varied angles. In some embodiments receiving images of the pattern from varied angles comprises taking pictures of the object including the pattern from various angles and storing the images in memory. In one embodiment receiving images of the pattern from varied angles comprises selecting previously received images at various angles from a group of images. In another embodiment receiving images of the pattern from varied angles comprises selecting from a group of images that simulate images of the pattern from varied angles. In block 309 the process corrects distortion in the images. In block 311 the pattern is detected in the corrected images. In some embodiments, process in block 307 receives a single image at an angle, and loops through blocks 307, 309 and 311, possibly multiple times. In block, 313 the process estimates internal parameters of the optical device.

Figure 4:
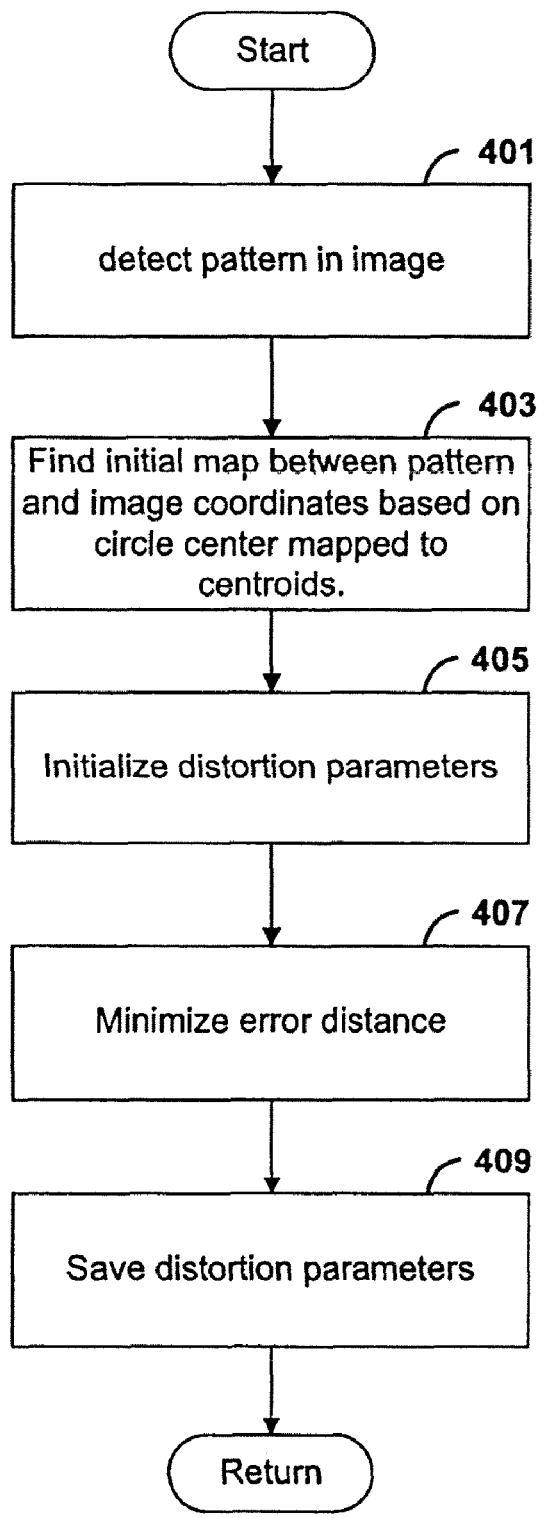
FIG. 4 is a logic flow diagram of a method showing one aspect of the present invention, for determining the distortion parameters of the optical device.

FIG. 4 is an example process for performing distortion parameter estimation. In some embodiments the process of FIG. 4 is used to perform the operations, methods, or functions of block 305 of the process of FIG. 3. In optional block 401, if a pattern has not already been detected in a previous process then the process detects the pattern in an image, for example, the pattern 601 In block 403, an initial projective transform map between the pattern coordinates and the image coordinates is performed by the process. In one embodiment, this initial map is based on mapping the circle centers in the pattern mapped to centroids in the image. In block 405 distortion parameters are initialized by the process. In one embodiment, a distortion center, for example a location in an image which the distortion emanates or a point that is invariant with respect to the distortion, $$C = \begin{pmatrix} c_u \\ c_v \end{pmatrix}$$

is initialized to the center of the image and the distortion parameters $k_1=k_2=k_3=k_4=0$ are all set to zero.

In block 407 the error distance is minimized by the process. In the absence of distortion the pattern, such as, for example, the pattern in 601, contains circle center points $X_{i,j}$. The projection of these points $X_{i,j}$ through an optical lens in a camera and into the camera memory, for example, is expressed as the points $U_{i,j}$. An equation that expresses this transformation or homography is shown in equation [1]

$$U_{i,j} = H_i(X_{i,j}) = \frac{\begin{pmatrix} a_{11} & a_{12} \\ a_{21} & a_{22} \end{pmatrix}_i X_{i,j} + \begin{pmatrix} b_1 \\ b_2 \end{pmatrix}_i}{1 + (c_1 \; c_2)_i X_{i,j}} \quad [1]$$

where $$X_{i,j} = \begin{pmatrix} x \\ y \end{pmatrix}_{i,j} U_{i,j} \begin{pmatrix} u \\ v \end{pmatrix}_{i,j},$$

with equation [1] in matrix/vector form, and parameters $\{a_{11}, a_{12}, a_{21}, a_{22}, b_1, b_2, c_1, c_2\}_i$ are homography parameters.

Index i is an observed image index (i=1, 2, 3, ..., n) where n is the number of the pattern views presented to the camera. j is the circle center point index j=1, 2, 3, ..., m where m is the number of circles in the pattern. The vector $$X_{i,j} = \begin{pmatrix} x \\ y \end{pmatrix}_{i,j}$$

represents the circle center point in the pattern, with for example x representing an x-axis coordinate of the circle center in the pattern. And y represents the Y-axis coordinate of the circle center in the pattern. The vector $$U_{i,j} = \begin{pmatrix} u \\ v \end{pmatrix}_{i,j}$$

represents the resulting coordinate of the circle center point $X_{i,j}$ in the image. In other words, $$U_{i,j} = \begin{pmatrix} u \\ v \end{pmatrix}_{i,j}$$

represents the new coordinate of $X_{i,j}$ after the homography of equation 1 is applied. The coordinate u represents the X-axis coordinate in the image coordinate space. The coordinate v represents the Y-axis coordinate in the image coordinate space. For each pattern view a different set of homography parameters may be used. If each of the points in the pattern were mapped using $H_i$ then the points making up the circles in the pattern would become ellipses in the resulting transformation or image. The resulting centroids of these ellipses do not coincide with the mapped circle centers $$\overline{U}_{i,j} = \begin{pmatrix} \overline{u} \\ \overline{v} \end{pmatrix}_{i,j}.$$

The difference between these two centers is a vector $\overline{\epsilon}_{i,j}$ where $\overline{\epsilon}_{i,j} = \overline{\epsilon}_{i,j}(H_i)$.

Using the vector equation [2], the distortion corrected coordinates are determined, in one embodiment.

$$U_{i,j}^{corrected} = D(\overline{U}_{i,j}) = C + (1 + k_1 r^2 + k_2 r^4 + k_3 r^6 + k_4 r^8)(\overline{U}_{i,j} - C) \quad [2]$$

Where $$U_{i,j}^{corrected}$$

is the distortion correct coordinate $$\overline{U}_{i,j} = \begin{pmatrix} \overline{u} \\ \overline{v} \end{pmatrix}_{i,j}$$

is the observed or distorted coordinate of the ellipse centroid point.

$$C = \begin{pmatrix} c_u \\ c_v \end{pmatrix}$$

is distortion center. $r = \|\overline{U} - C\|$ is the distance from the distortion center and $\{k_1, k_2, k_3, k_4, c_u, c_v\}$ are the distortion parameters.

The square distance between the predicted center and the distortion corrected observation is the elementary error for this circle. Adding these for all circles becomes the global error. This global error depends on the unknown distortion parameters and the unknown planar projective transformations between the pattern and the images of the pattern. The equation for the global error is seen in equation [3] below.

$$E = \sum_{i,j} \|H_i(X_{i,j}) + \overline{\epsilon}_{i,j}(H_i) - D(\overline{U}_{i,j})\|^2 \quad [3]$$

The initial guess for the planar projective transform is given by 403. Since equation [2] is a sum of quadratic terms, a minimum error distance described in equation [3] may be computed using an iterative approach such as Levenber-Marquardt minimization or some other optimization procedure. In block 409 the distortion parameters are saved.

Figure 5:
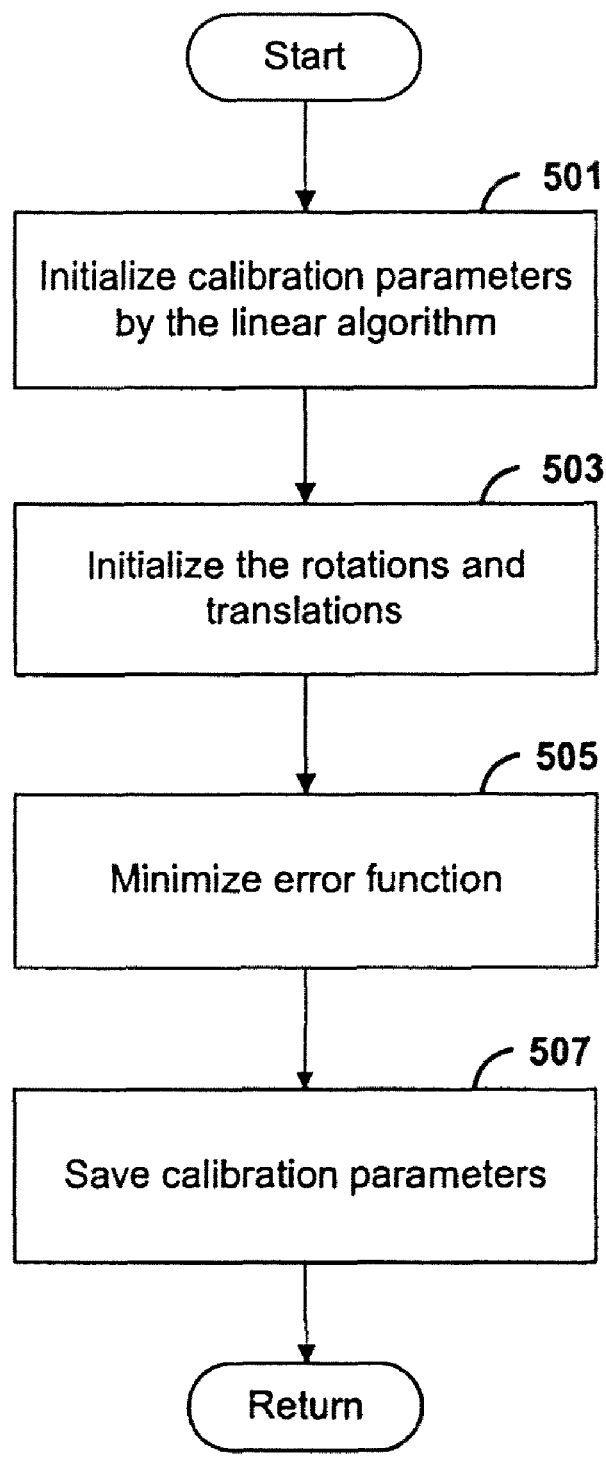
FIG. 5 is a logic flow diagram of a method showing one aspect of the present invention, for estimating the calibration parameters of the optical device.

FIG. 5 is a process for determining the estimation of the optical device internal parameters. In some embodiments the process of FIG. 5 is used to perform the operations, functions, or methods of block 313 of the process of FIG. 3. The homography equation seen in equation [1] can also be expressed in terms of the camera calibration parameters, camera location, and camera orientation parameters as seen in equation [4].

$$U_{i,j} = H_i(X_{i,j}) = \frac{\begin{pmatrix} f_x & s & c_x \\ 0 & f_y & c_y \end{pmatrix}(R_i \tilde{X}_{i,j} + T_i)}{(0 \ 0 \ 1)(R_i \tilde{X}_{i,j} + T_i)} \quad [4]$$

Where $R_i$ and $T_i$ are camera rotation and translation of pattern view i relative to pattern coordinates $$\tilde{X}_{i,j} = \begin{pmatrix} x \\ y \\ 0 \end{pmatrix}_{i,j} = \begin{pmatrix} X_{i,j} \\ 0 \end{pmatrix}.$$

And ($c_x$, $c_y$, $f_x$, $f_y$, s) are the camera internal calibration parameters.

In block 501 the calibration parameters are initialized. Using the estimated homographies between the pattern and each of the views, each image provides two linear constraints on the calibration parameters. Each of the views may be, for example, determined from the steps 307, 309 and 311 described above in FIG. 3. By combining at least three views, the calibration matrix or in other words the optical device internal calibration parameters, can be estimated. In block 503 the rotations and translations are initialized. By factoring out the calibration matrix from the homographies, the rotation and translation between the optical device or camera positions and the different positions of the pattern planes are initialized. In block 505 an error function is computed similar to the error function of the distortion parameter process. This error function is minimized to determine the optimal calibration matrix. Equation [3] above is the same error function used for the minimization. However, the minimization of equation [3] in this block is performed with respect to the calibration parameters ($c_x$, $c_y$, $f_x$, $f_y$, s), the camera rotation $R_i$, and the camera translation $T_i$. At this stage the distortion coefficients can be fixed from the previous computation or they can be estimated at the same time. A nonlinear iterative minimization method can be used to minimize equation [3]. A linear method can be used to compute the initial value for non-linear method. In block 507 the calibration parameters are saved.

FIG. 6 shows one embodiment of a pattern 601 that may be used for pattern detection and/or distortion correction and/or calibration or any other application. The pattern 601 is a useful pattern that may be used. The pattern 601 may be used to locate a position of an object, calibration of an optical device, general object identification or distortion correction. For example if the pattern 601 is used to locate a position of an object in 3D such as a cube, the cube may be covered on several sides with the pattern 601. Using the pattern detection process described below the cube may be accurately located. Another example may be painting an automobile with the pattern in 601, and then filming the automobile on video. Using pattern detection, for example as discussed herein, the automobile in the video may be located and identified. Another use for the pattern 601 may be for optical device calibration or distortion correction as discussed herein. Element 603 is an example of a ring or circle with hole. Element 621 is an example of a solid circle. Example Cartesian coordinate or grid positions for centers of each of the elements identified in FIG. 6 are listed below in Table 1. Describing the positions of the centers of the ringed circles and solid circles is not limited to a Cartesian coordinate description. Other coordinate systems could be used such as a polar coordinate system.

TABLE 1

| FIG. 6 Element | Cartesian Coordinate (X,Y) |
|---|---|
| 603 | (0, 0) |
| 605 | (0, −1) |
| 607 | (0, 1) |
| 609 | (−1, 0) |
| 611 | (−2, 0) |
| 613 | (−3, 0) |
| 615 | (−4, 0) |
| 617 | (−5, 0) |
| 619 | (−6, 0) |
| 621 | (−1, 1) |

The knowledge of the positions of certain sub-patterns in an image gives rise to the knowledge of the horizontal and vertical axis of the image. For example, knowledge of the positions of the detected elements 603, 605, 607, 609, 611 and 613 in an image is enough information to be able to determine the orthogonal axes of the received image. For example, if an image of the pattern 601 is received using a digital camera and the sub-pattern in 601 (i.e. elements 603, 605, 607, 609, 611 and 613) is detected in the received image then knowledge of the horizontal and vertical axis of the image residing in memory has been determined. Although elements 619, 617 and 615 are depicted as ring elements, they do not necessarily need to be rings, they could be solid circles. Although pattern 601 is depicted as nine rows by thirteen columns, pattern 601 may be any dimension as long as the orthogonal axes may be distinguished from each other. For example, the grid vertical axis is distinguished from the grid horizontal axis because the grid vertical axis contains only three ring elements 605, 603, and 607. Whereas the grid horizontal contains more than three ring elements. The pattern 601 is not limited to being a pattern of ringed circles and solid circles. The pattern 601 can be a pattern of elements having any geometrical properties. For example, a pattern of squares, rectangles, triangles, corners of a square or corners in general, or in general any shapes may be used instead of the pattern 601. Additionally, a pattern may be selected such that some of the geometrical properties of the shapes in the pattern are invariant under near projective transformations. For example when an image of a circle is taken from an arbitrary 3D position, the image of the circle is going to be an ellipse. This property is considered to be invariant. A pattern with shapes may be selected on the basis of a method's ability to detect the shapes in the pattern under a near projective transformation.

Figure 9:
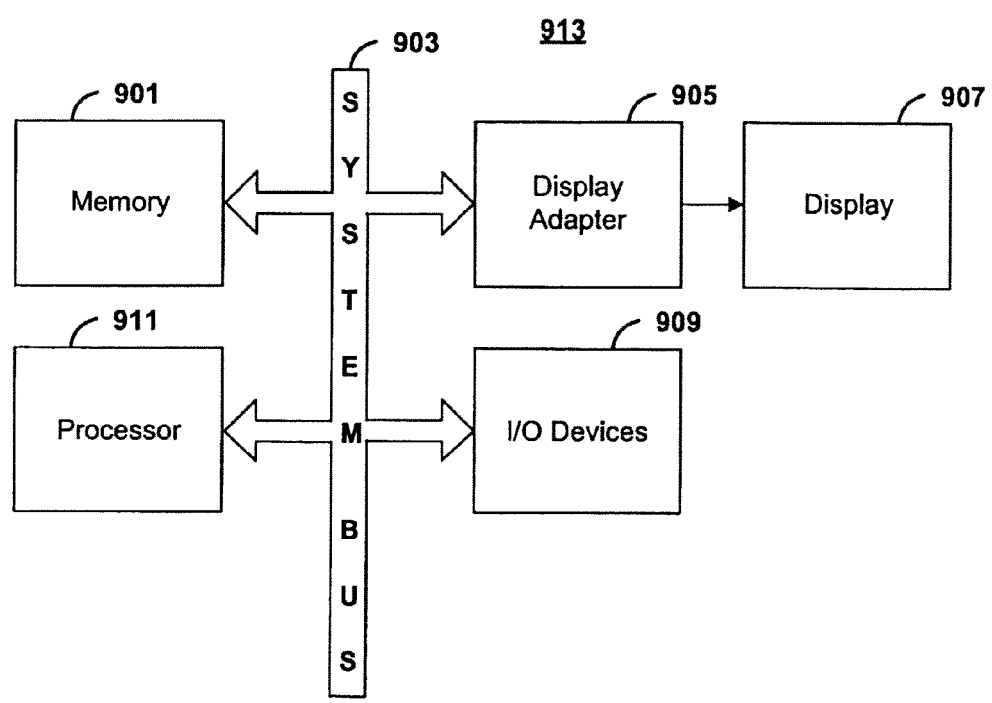
FIG. 9 is a block diagram showing one aspect of the present invention depicting a general purpose computing device constituting an exemplary system for implementing the present invention.

FIG. 9 depicts a general purpose computing device implementing aspects of the present invention. This general purpose computing device can be in the form of a conventional personal computer 913. However aspects of the present invention may also be implemented in other devices such as hand-held devices, multiprocessor systems, microprocessor-based consumer electronics, network PC's, minicomputers, mainframe computers, computers that operate in automobiles, embedded systems in cameras, embedded systems, cellular handsets and any system or environment that has the ability to execute software to perform the methods described herein.

With reference to FIG. 9, 913 is a general purpose computing device in the form of a conventional personal computer, including a processing unit 911, a system memory 901, and a system bus 903 that couples, various system components including the system memory to the processing unit 911. In most embodiments the processing unit is configured, for example by program instructions in the system memory, to determine distortion and/or calibration parameters as discussed herein and to command saving of the parameters in memory. The system bus 903 may be of any type commonly known in the art of personal computers and motherboard design. In one embodiment, the system bus 903 is any medium or structure used for transferring information from one element to another such as transferring image information from any one of the I/O Devices 909 to the memory 901. An example and one embodiment of a system bus 903 that is in common use today is the PCI bus. The system memory 901 may contain read only memory (ROM) and random access memory (RAM) both not shown in FIG. 9. The system memory 901 may also contain the basic input/output system (BIOS), containing the basic routine that helps transfer information between elements within the personal computer 913, such as during start-up, may be stored in ROM. The BIOS is not shown specifically in FIG. 9. The I/O Devices 909 comprises common personal computer interface devices such as a hard disk drive for reading from or writing to a hard disk, a magnetic disk drive for reading from or writing to a removable magnetic disk, an optical disk drive for reading from or writing to a removable optical disk such as a CD-ROM or other optical media, a keyboard for use as an input device, a pointing device such as a mouse, joystick or trackball for inputting commands to the computer. Other I/O devices 909 (not shown specifically) may be used with the personal computer 913 such as a microphone, game pad, satellite dish, scanner, and digitizing tablet. These input devices may be connected to the computer via universal serial bus (USB), serial port, IEEE 1394 or other proprietary interfaces such as PICT. Other I/O Devices 909 include a camera such as a digital camera, a video camera or any optical device, capable of capturing an image or a sequence of images may also be an I/O Device to the personal computer 913. The camera interface portion may be a USB interface, memory card or it may be a proprietary interface. For each type of camera interface, the camera and the camera interface are capable of transferring information about images or sequence of images from the camera to the personal computer 913. The I/O devices interface 909 is coupled to the system bus 903, allowing the images or sequence of images, such as those discussed herein, from any I/O device to be routed to and stored in the memory 901 or any other data storage device accessed via a I/O device interface 909 associated with the personal computer 913. Images or sequence of images (hereinafter referred to as data) may also be contained on other computer readable media such as a removable magnetic disk, removable optical disk, flash card, memory key, random access memory, read only memory, memory stick or a host of commonly available computer readable media. Data stored on computer readable media may not require the use of the camera. A display 907 is also connected to the system bus 903 via a display adapter 905. Other devices that may be connected to the personal computer 913 but are not shown are printers, facsimiles, internal modems, and controller cards. These devices may also be connected to the computer via the I/O Devices 909.

The personal computer 913 may operate in a networked environment using one or more connections to one or more remote computers or devices (not shown). The remote computer may be a similar personal computer, a server, a router, a network PC, a peer device, a hand-held device, a camera, a cellular handset, a cash register, a printer, a storage device, a facsimile, or any other device capable of communicating with the personal computer in a networked environment. The I/O devices 909 interface on the personal computer comprises methods for performing communications in a networked environment. In one embodiment, the I/O devices 909 comprises an Ethernet card or modem. In one embodiment the networked environment may be a local area network (LAN) or wide area network (WAN). These types of networked environments are common in offices, intranets, and the Internet.

In many embodiments images are stored in memory, processed by the processor as discussed herein, and stored in the memory or displayed after processing.

Figure 10:
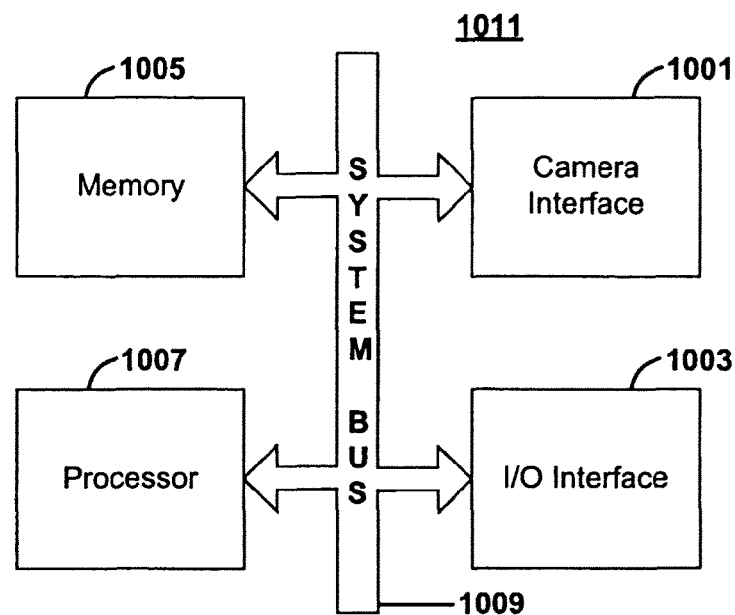
FIG. 10 is a block diagram showing one aspect of the present invention depicting an embedded system constituting an exemplary system for implementing the present invention.

FIG. 10 depicts one embodiment of an embedded system 1011 for implementing the present invention. In one embodiment this embedded system 1011 may be specifically designed to perform the present invention. In other embodiments, the embedded system 1011 may perform other functions in addition to the present invention. The embedded system 1011 may be included in a handheld device, included in an automobile, included in a cash register, included in a photo printer or printer, included in a raster image processor (RIP), included in a facsimile machine, included in a kiosk, included in a camera, included in a video camera, included in router or included in any standalone device. In some embodiments such as just described, the elements of 1011 may be shared with the hosting device. For example, if 1011 is included in a photo printer then processor 1007, memory 1005, optional camera interface 1001 and optional I/O interface 1003 may be shared with the photo printer functions. Additionally, in this example, the photo printer may have additional elements (not shown) coupled to the system bus 1009 to perform the additional photo printer functions. This embedded system contains a processor 1007, memory 1005, a system bus 1009, a camera interface 1001, and a general input/output (I/O) interface 1003. The camera interface 1001 and the I/O interface 1003 are both optional. Each of the elements is coupled through the system bus 1009 to the processor 1007. The processor 1007 may be a microprocessor, microcontroller, application specific integrated circuit (ASIC), field programmable gate array (FPGA), image processor, any type of processor capable of processing program instructions, or any type of integrated circuit (IC) capable of being programmed to perform the methods of the present invention. The processor is configured, either by circuitry or by program instructions, to perform the processes discussed herein. The system bus 1009 is any type of system bus that is commonly known in the art of embedded system design. A camera (not shown) such as a digital camera, a video camera or any optical device, capable of capturing an image or a sequence of images may be connected to the camera interface 1001. The images from the camera are input to the embedded device 1011 via the camera interface 1001. The camera interface 1001 may be a USB interface, an interface capable of transferring images to the embedded system or it may be a proprietary interface. For each type of camera interface 1001, the camera (not shown) and the camera interface 1001 are capable of transferring information about images or sequence of images from the camera to the embedded device of FIG. 10. The camera interface 1001 is coupled to the system bus 1009, allowing the images or sequence of images from the camera (not shown) to be routed to and stored in the memory 1005. The memory 1005 may be any combination of RAM, ROM, programmable read only memory (PROM), electronically programmable read only memory (EPROM), and flash memory or any of these equivalents. The memory 1005 may be permanently wired to the embedded system 1011 or it may be removable. An example of a removable memory is a memory that can be removed and replaced by human hand or tool such as a memory stick. The I/O interface 1003 may be any type of interface that can communicate with devices. In one embodiment the I/O interface 1003 is a USB type interface. In another embodiment, the I/O interface 1003 can be IEEE 1394. The I/O interface 1003 is optional thus, for an embedded system 1011, the I/O interface 1003 will only be present if required by the embedded system.

Figure 11:
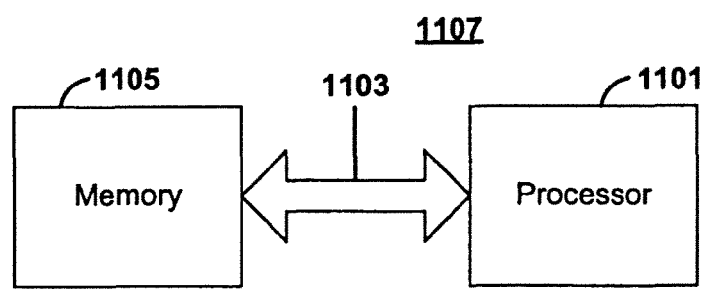
FIG. 11 is a block diagram showing one aspect of the present invention depicting a limited number of components in an embedded system constituting an exemplary system for implementing the present invention.

FIG. 11 is another diagram of one embodiment of an embedded system 1107 for implementing aspects of the present invention. The embedded system 1107 contains only a processor 1101, a system bus 1103, and a memory 1105. The embedded system 1107 is one embodiment used to show that minimal elements are required to perform the methods of the present invention. The embedded system 1107 may be included in a handheld device, included in an automobile, included in a cash register, included in a photo printer or printer, included in a raster image processor (RIP), included in a facsimile machine, included in a kiosk, included in a camera, included in a video camera, included in router or included in any standalone device. The processor 1101 is similar to or the same as the processor 1007. The system bus 1103 is similar to or the same as the system bus 1009. The memory 1105 is similar to or the same as the memory 1005.

Figure 12:
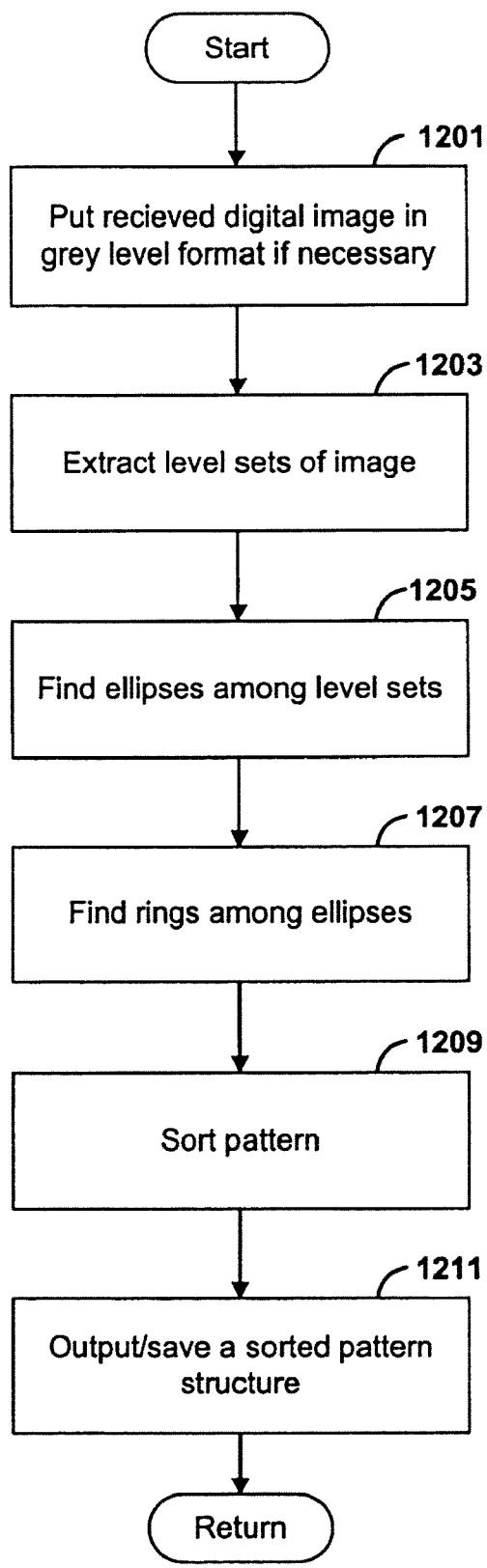
FIG. 12 is a logic flow diagram of a method showing one aspect of the present invention, for detecting the pattern in the image or video frame.

FIG. 12 is a process for detecting a pattern in an image. The example embodiment in FIG. 12 may utilize a pattern of circles 601 such that when the near projective transform is applied to the pattern 601 the image results in shapes that have elliptical properties. In some embodiments the process of FIG. 12 is used to perform the operations, functions, or methods of block 303 of the process of FIG. 3. For example, if an application requires just pattern detection only the block 303 may be used. Any block described in the present invention is modular and may be used individually in other applications. Once the image has been received as in block 301, the image of the pattern is in a memory. According to block 1201 the image of the pattern if not already in a grey level format may optionally be converted to a grey level format, according to this embodiment.

Figure 8:
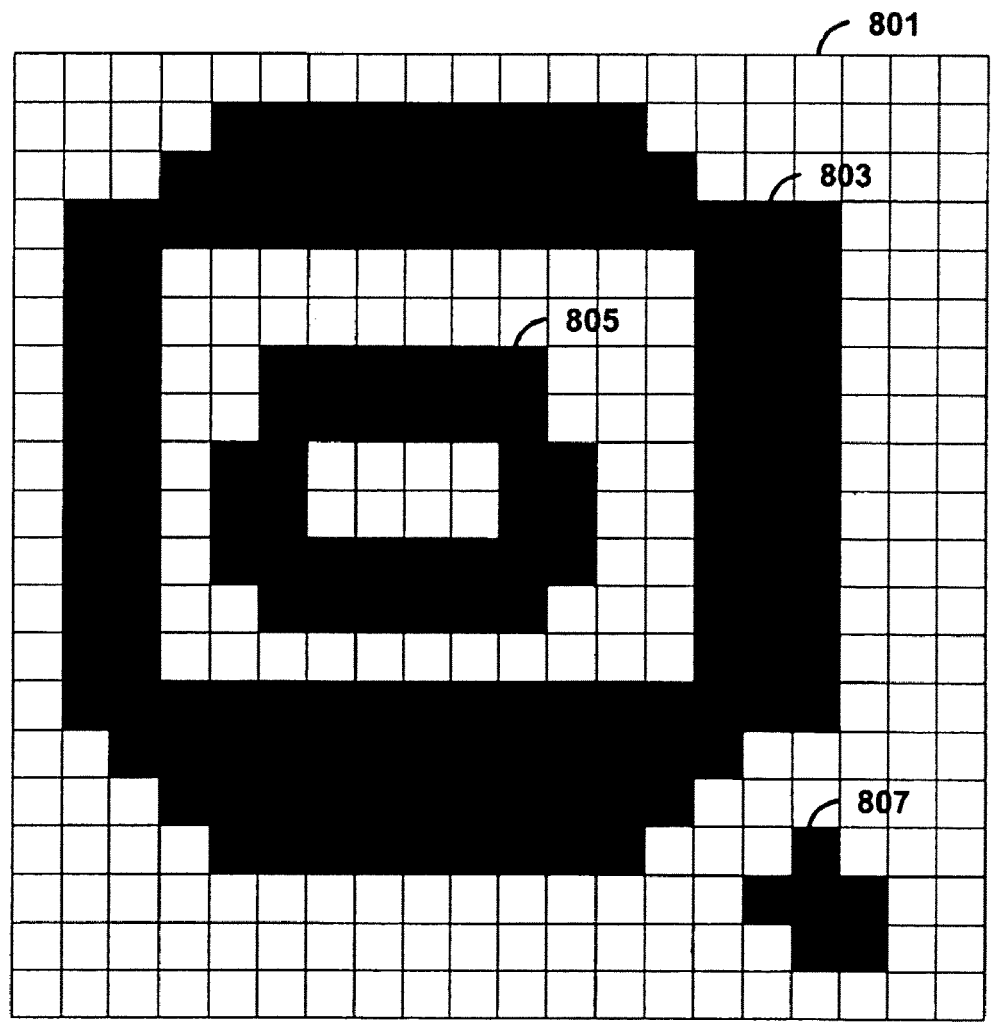
FIG. 8 illustrates an example of a lower level set.

In block 1203 level sets are extracted from the image. An upper or superior level set is a set pixels such that the grey level value at each pixel is greater than a specific threshold c. A lower or inferior level set is a set of pixels such that the grey level value at each pixel is less than a specific threshold. Many of the level sets may be extracted by varying the threshold from the lowest grey level value to the highest grey level value and obtaining the upper and lower level sets for each of the thresholds. FIG. 8 shows an example of a single lower level set. 801 shows a grid of pixels whose grey level values reside in a memory. The pixels that are white in this example have a grey level value of 255. The pixels that are black have a grey level value of 10. Thus, for the threshold c=15 the lower level set less than 15 can be seen in FIG. 8. All of the pixels whose grey level value is less than 15 are indicated by the blackened pixels whose grey level values are equal to 10. The white pixels have a grey level values that are greater than 15, such as 255. Each pixel in the image may be referred to by a set of coordinates. In one embodiment, the coordinate system used is a Cartesian coordinate system such that a pixel may be located in an image by coordinates (u,v) where u is the column coordinate and v is the row coordinate. In another embodiment, the coordinate system may be a Polar coordinate system. The method may work with any coordinate system.

In block 1205 ellipses are found among the level sets. In block 1207 rings in the image are found among the determined ellipses from block 1205. In block 1209 the list of ellipses determined in block 1205 are sorted so that they are arranged similar to the pattern 601. In one embodiment, the coordinate system utilized to describe positions in the pattern 601 is a Cartesian coordinate system. In this embodiment a position in the pattern 601 is described by (X,Y). Any coordinate system may be used to describe positions in the pattern 601. In block 1211 the sorted pattern is known or has been detected and the completed data structure may be outputted, saved, or used in another process.

Figure 13:
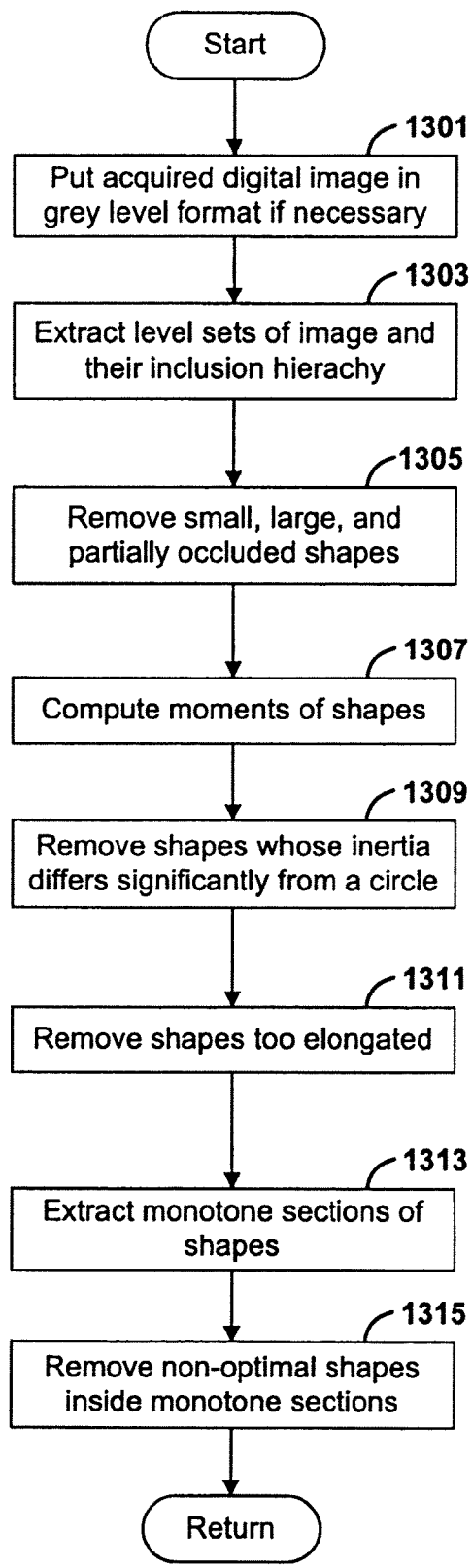
FIG. 13 is a logic flow diagram of a method showing one aspect of the present invention, for detecting ellipse shapes.

FIG. 13 is a process for finding or determining ellipses among level sets. In some embodiments the process of FIG. 13 is used to perform the operations, functions, or methods of block 1205 of the process of FIG. 12. Once the image has been received as in block 1201. The image of the pattern is in a memory. According to block 1301, an optional block, the image of the pattern if not already in a grey level format may be converted to a grey level format, according to this embodiment. According to block 1303 if the level sets have not already been extracted from the image, then the level sets may be extracted from the image. Additionally, in block 1303 the inclusion hierarchy is determined. An example of an inclusion hierarchy is illustrated in FIG. 8. Note that FIG. 8 shows a single lower level set where c=15. To determine a complete inclusion hierarchy more level sets at various thresholds may need to be extracted. Since the shape defined by the blackened pixels labeled element 805 is contained within the boundaries of shape 803 then shape 803 is a child to the parent shape 805. The inclusion hierarchy for all shapes at all level sets extracted at various thresholds defines a tree structure of shapes.

In block 1305 small, large and partially occluded shapes are removed. A shape is a connected set of pixels. A 4-connected set shape is a shape made up of pixels whose neighbors are only on 4 sides of the pixel. An 8-connected set shape is a shape made up of pixels whose neighbors can be on the 4 sides of the pixel but also on the extra 4 diagonals or 4 points of the pixel. In one embodiment, a small shape may be a shape that contains a certain number of pixels or less. For example, in FIG. 8 we may define a small shape as having less than 20 pixels. Thus, in this example shape 807 would be removed. However, shapes 803 and 805 would remain because they have greater than 20 pixels. In one embodiment, a large shape may be defined has having more than 1% of the pixels in the image. In one embodiment, an occluded shape is a shape containing one or several pixels at the boundary of the image frame. In other embodiments we may define small shapes with any number of pixels. In other embodiments, we may define large shapes as any percentage of the pixels in the image. The method is not limited to 20 pixels for small shapes and 1% of the pixels in the image for large shapes. Next in block 1307 the moments of the shapes remaining are determined or computed. The second order moments and centroid of any shape can be determined using the following equations:

$$(\bar{u},\bar{v}) = (\Sigma u_s/n, \Sigma v_s/n) \quad [5]$$

$$I_{i,j} = \Sigma(u_s - \bar{u})^i (v_s - \bar{v})^j \text{ for } (i,j) = (2,0) \text{ or } (1,1) \text{ or } (0,2) \quad [6]$$

Equation [5] is used in some embodiments to determine the centroid of the shape. The coordinates of the centroid are ($\bar{u}$, $\bar{v}$). The variable n is the number of pixels of the shape. The variable $u_s$ is the column coordinate of the pixel stored in a memory and the variable $v_s$ is the row coordinate of the pixel stored in a memory. Equation [6] is used to determine the second order moments of the shape. In block 1309, according to one embodiment, the shapes whose inertia differs significantly from a circle are removed. According to one embodiment, the inertia of a shape can be determined using the following equation:

$$I=(I_{2,0}I_{0,2}-I_{1,1}^2)/n^4 \quad [7]$$

For a circle the inertia is:

$$I_C=1/(4\pi)^2 \quad [8]$$

Relative difference of Inertia from a circle:

$$|I-I_C|/I_C \quad [9]$$

Thus, according to block 1309 equation [9] is computed in one embodiment. If the value is greater than some tolerance, for example, 5% then the shape is removed. Any tolerance value may be used. In block 1311 shapes that have too much elongation are removed. According to one embodiment, elongation is determined by evaluating the 2×2 symmetric matrix of moments in equation [10].

$$\begin{Bmatrix} I_{2,0} & I_{1,1} \\ I_{1,1} & I_{0,2} \end{Bmatrix} \quad [10]$$

Equation [11] shows the two positive eigenvalues for the matrix of inertias in equation [10].

$$(T+\sqrt{T^2-4D})/2 \quad [11]$$

where $T=I_{2,0}+I_{0,2}$ and $D=I_{2,0}I_{0,2}-I_{1,1}^2$

The value T is referred to as the trace of the matrix. The value D is referred to as the determinant of the matrix. For an ellipse, the eigenvalues computed or determined in equation [11] are the lengths of the semi-axis, as is known in the art. Thus, the elongation of the shape may be determined by the ratio of the eigenvalues as depicted in equation [12].

$$(T+\sqrt{T^2-4D})/(T-\sqrt{T^2-4D}) \quad [12]$$

If the ratio of eigenvalues in equation [12] is above a threshold for example 2, then we remove the shape. Any threshold may be used in this method. Block 1313 extracts the monotone sections of shapes. In one embodiment, a monotone section is a list of shapes ShapeInfo(1), . . . ShapeInfo(k) where k is an integer, such that all of the shapes are of the same type, either upper level sets or lower level sets and ShapeInfo(i) is the only child of ShapeInfo(i−1) for i=2, . . . , k. In block 1315 non-optimal shapes inside monotone sections are removed. In one embodiment, the optimality of a shape may be determined by the shape's geometry. For example, the shape with the lowest relative difference of inertia as compared to a circle (equation [9]). In another embodiment, the optimality of a shape may be determined by its contrast. For example, the shape with the greatest average contrast, median contrast, or greatest minimal contrast across its boundary.

Figure 14:
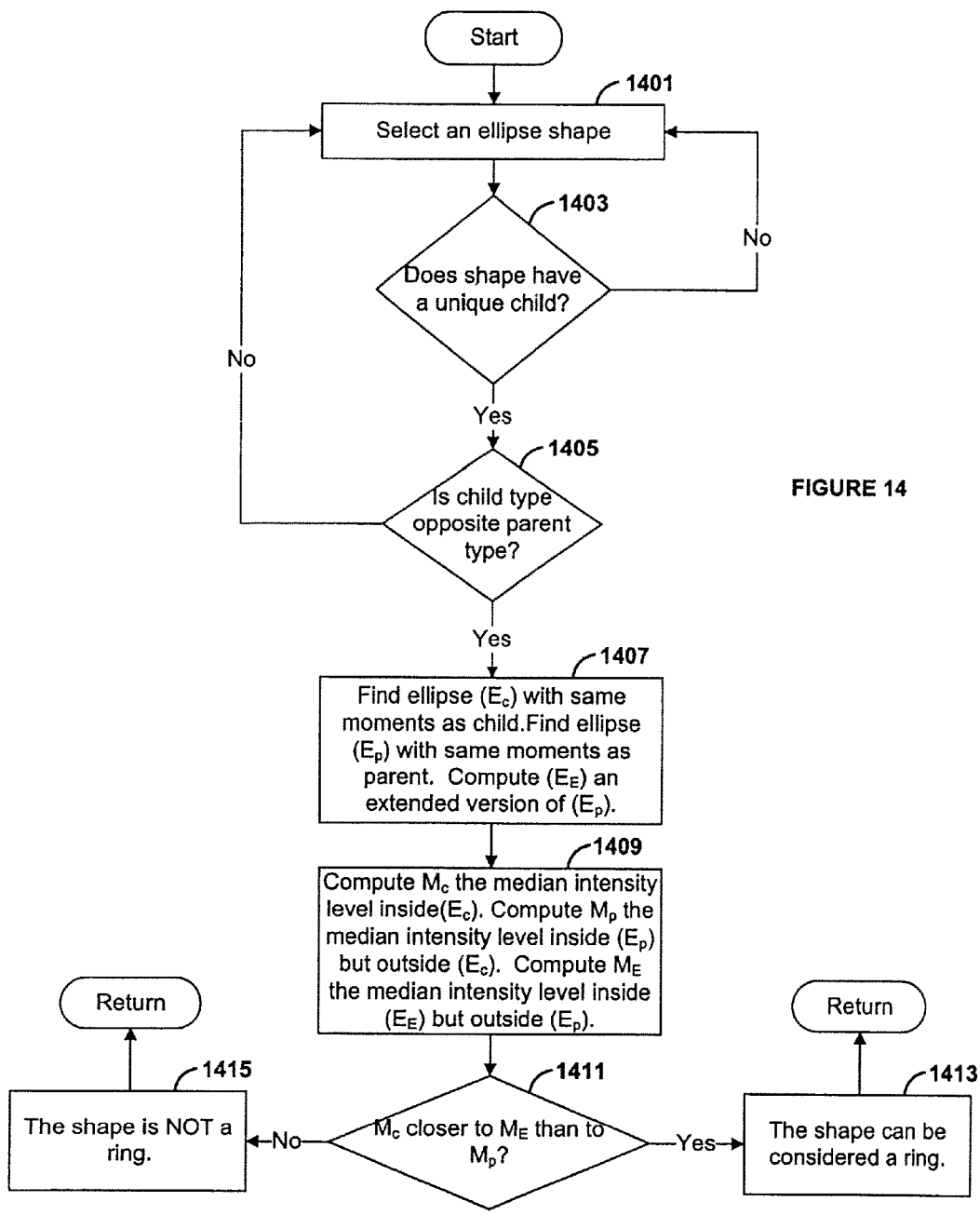
FIG. 14 is a logic flow diagram of a method showing one aspect of the present invention, for determining ring shapes among the ellipse shapes.

FIG. 14 is a process for finding or determining find rings among ellipses. In some embodiments the process of FIG. 14 is used to perform the operations, functions, or methods of block 1207 of the process of FIG. 12. In block 1401 the process selects an ellipse shape among the shapes of ellipses available. The method of finding rings among ellipses may be performed on any of the shapes available. Block 1403 determines if the shape selected has a unique child. If the selected shape does not have a unique child shape then the process loops back to element 1401 and repeats. If the selected shape does have a unique child shape then the process continues. Block 1405 determines if the child type is opposite the parent type. In one embodiment the type refers to whether the shape is from an upper level set or a lower level set. In order to be a ring, the type of the child shape should be opposite from the type of the parent shape. If the type of the parent shape and child shape are not opposite then the process jumps back to block 1401. If the type of the parent shape and child shape are opposite then the process is continued to the next block 1407. In block 1407 an ellipse with the same moments as the child ellipse shape is computed $E_C$ and an ellipse $E_p$ with the same moments as the parent ellipse shape is computed. Also a dilated version of $E_p$ called $E_E$ is computed. $E_E$ is usually computed with a fixed zoom factor of typically 1.5, however this is not a requirement. In block 1409 median intensity levels are computed as known to those skilled in the art. The median intensity level $M_C$ inside the ellipse $E_C$ is computed. The median intensity level $M_p$ inside the ellipse $E_p$ but outside the ellipse $E_C$ is computed. The median intensity level $M_E$ inside the ellipse $E_E$ but outside the ellipse $E_p$ is computed. In block 1411 the intensity levels just computed in 1409 are evaluated. If the median intensity level $M_C$ is closer in value to the median intensity level $M_E$ than to $M_p$ then the shape can be considered a ring. If the median intensity level $M_C$ is closer in value to the median intensity level $M_p$ than to $M_E$ then the shape is not a ring.

Figure 15:
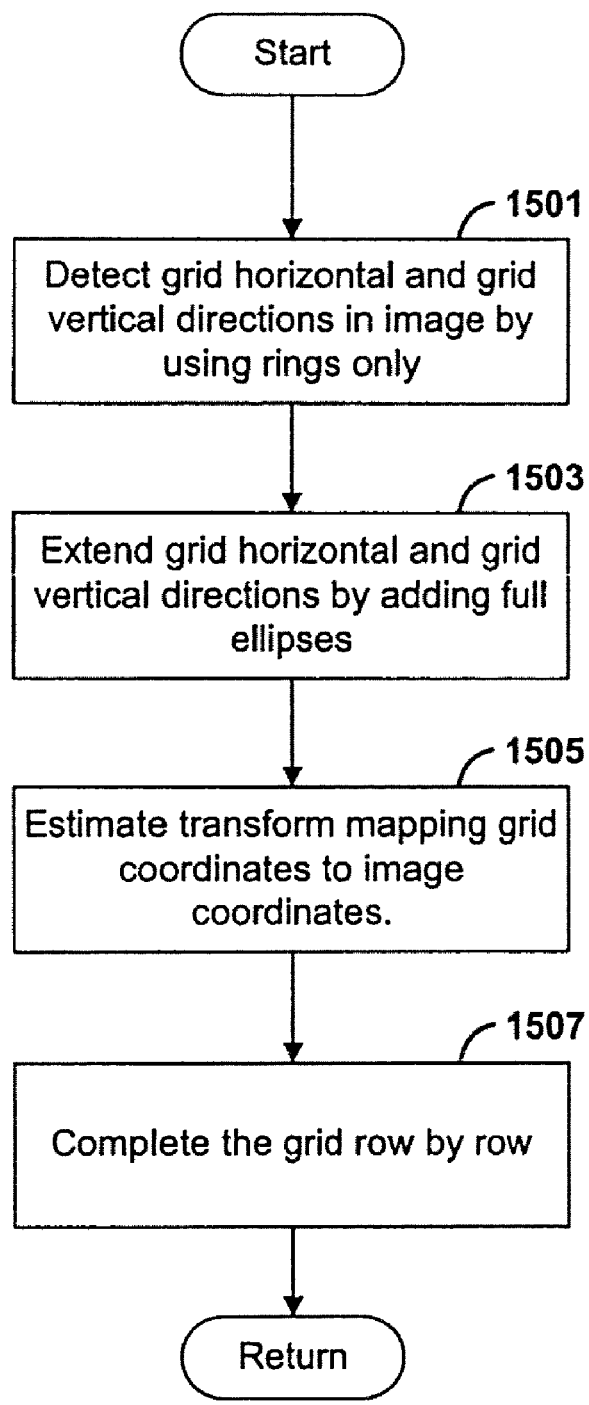
FIG. 15 is a logic flow diagram of a method showing one aspect of the present invention, for determining the pattern of ellipse shapes and rings in the image.

FIG. 15 is a process for determining the pattern of ellipse shapes and rings in the image. In some embodiments the process of FIG. 15 is used to perform the operations, functions, or methods of block 1209 of the process of FIG. 12. The sort pattern process may result in a list of ellipses from the received image that corresponds to matching positions in the pattern 601. In one embodiment, the sort pattern process depicted in FIG. 15 may assign to ring and ellipse centers their corresponding pattern 601 coordinates. In one embodiment, the sort pattern process in FIG. 15 contains four blocks 1501, 1503, 1505, and 1507. In block 1501 the grid vertical or Y axis that, for example may be defined by elements 603, 605, and 607 in one embodiment, is determined. Additionally, in process 1501 the grid horizontal or X axis that, for example may be defined by elements 603, 609, 611, and 613 in one embodiment, is also determined. Since one of the axes contains three ring elements 605, 603, and 607, the two orthogonal axes in the image can be distinguished.

Figure 16:
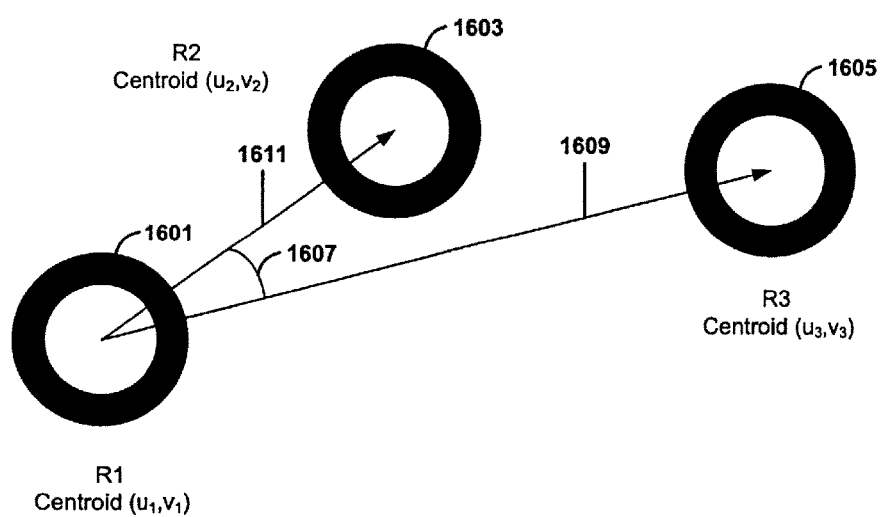
FIG. 16 is diagram showing one aspect of the present invention, depicting three ring shapes and their angular relationship.

In one embodiment, block 1501 achieves the identification of the two orthogonal axes by looping through all available rings three at a time. In this example R1, R2, and R3 are the current triple ring selection. FIG. 16 shows an example of rings R1, R2, and R3, labeled 1601, 1603, and 1605 respectively. The vectors 1609 and 1611 and the angle 1607 are determined using the coordinates of the centroids of R1, R2 and R3. If the angle 1607 is less than a threshold, for example, 10 degrees, then rings R1, R2 and R3 are in alignment and may be considered to be on a single axis. This process is used to determine both the grid horizontal or X axis and the grid vertical or Y axis rings in the image. In one embodiment, equation [13] may be used to determine the angle between the vectors. For example if $\alpha=$the angle 1607 then equation [13] will compute the angle 1607 where the coordinates from the centroids are indicated in FIG. 16.

$$\cos(\alpha) = \frac{(u_2-u_1)(u_3-u_1)+(v_2-v_1)(v_3-v_1)}{\sqrt{((u_2-u_1)^2+(v_2-v_1)^2)((u_3-u_1)^2+(v_3-v_1)^2)}} \quad [13]$$

In one embodiment, block 1503 extends the grid in the horizontal and vertical directions on the X and Y axis by using a process similar to 1501 on the remaining full ellipses. Block 1503 determines the full ellipses that lie on the horizontal right facing axis, the vertical upward facing axis, and the vertical downward facing axis. An angular comparison, similar to the one described above is computed according to equation [13] that determines whether an ellipse is on the appropriate axis. Additionally, the distance between the centroids of the full ellipse and the origin is saved to later determine the appropriate position on the X or Y axis of the pattern. The left facing horizontal axis is not computed because it is made up of rings. These rings were already computed in a previous process described above.

Block 1505 estimates the transform mapping of grid or pattern coordinates, such as the (X,Y) coordinates of FIG. 6 to image coordinates, such as the (u,v) coordinates of the image stored in a memory. This is possible because at this point in the process the image coordinates of the centroids of each of the ellipses on the axes have been mapped or determined or corresponded to position coordinates in the pattern. The transform mapping is a standard linear algorithm estimating the homography (8 parameters) mapping 4 or more points in one plane coordinate system to corresponding points in another plane coordinate system. In block 1507 using the transform mapping determined in block 1505 the remaining full ellipses are positioned on a row by row basis.

Figure 17:
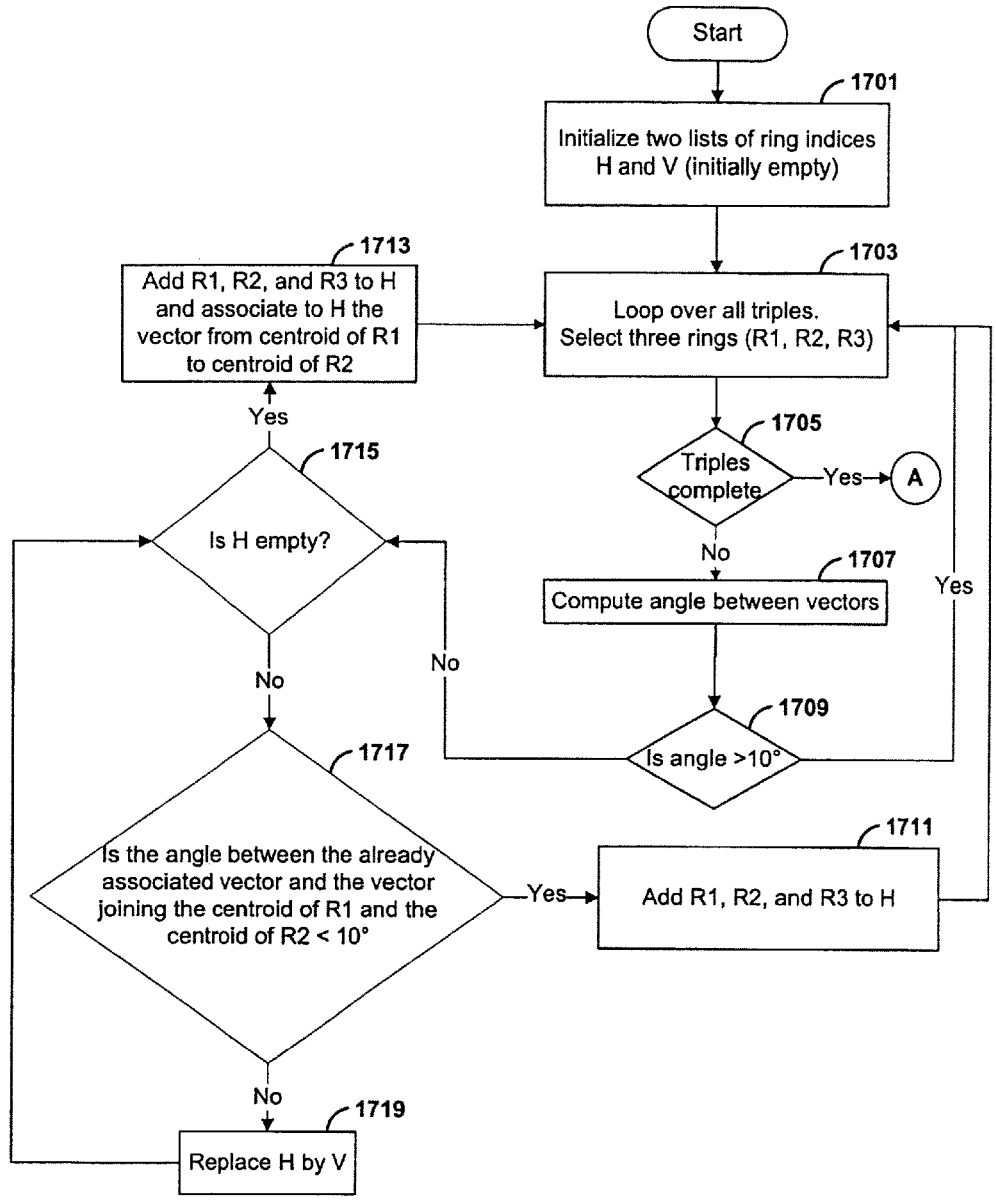
FIG. 17 is a logic flow diagram of a method for detecting the grid horizontal and grid vertical directions in the image by using the rings only.
Figure 18:
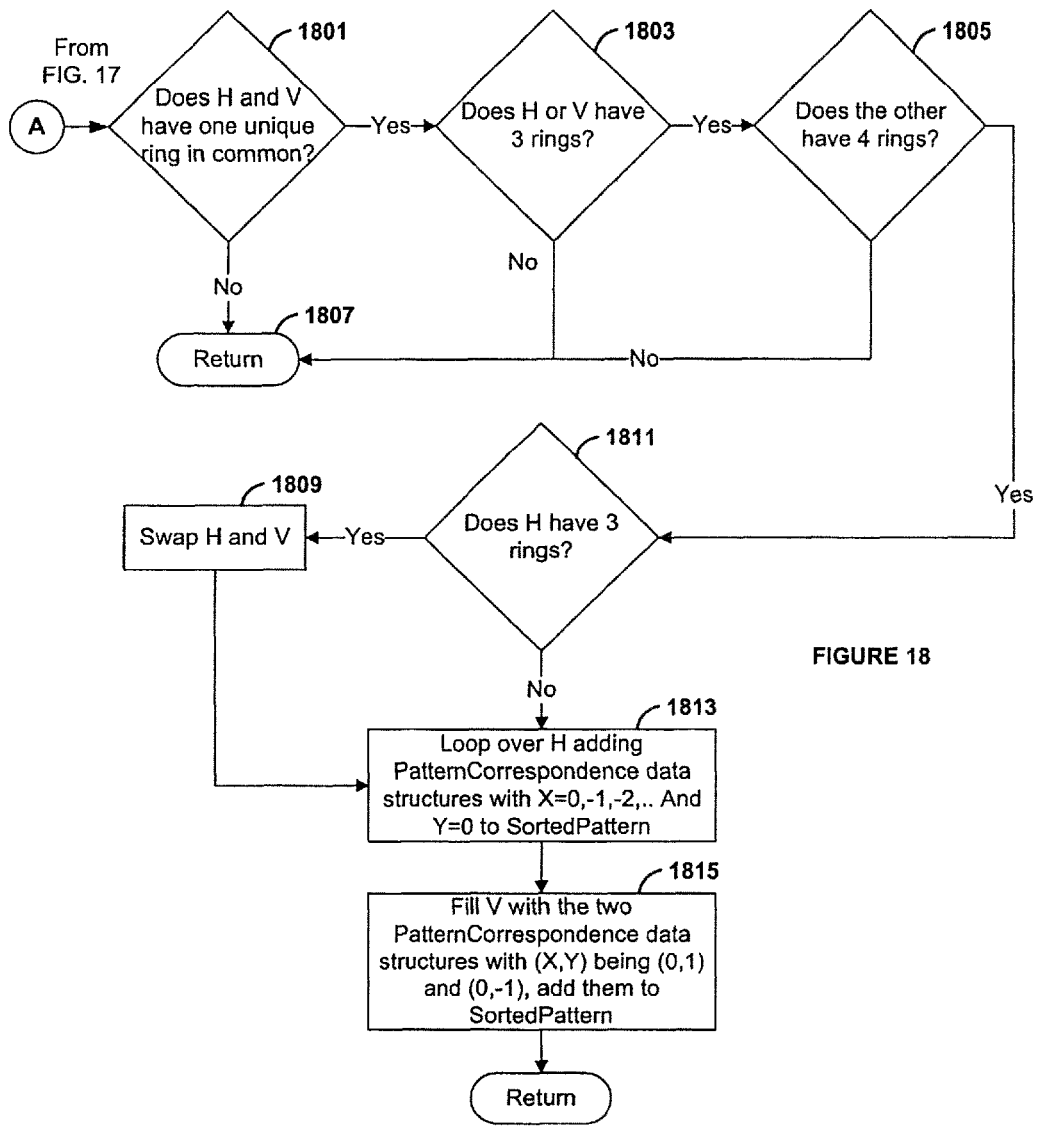
FIG. 18 is a logic flow diagram of the continuation of FIG. 17.

FIG. 17 and FIG. 18 depict a process for determining the grid horizontal and grid vertical directions in the image by using rings only. In some embodiments the process of FIG. 17 and FIG. 18 are used to perform the operations, functions, or methods of block 1501 of the process of FIG. 15. In block 1701 two lists of ring indices H (for horizontal) and V (for vertical) are initialized to be empty. In block 1703 a loop over all triplets of rings begins. R1, R2, and R3 refer to the current triplet selection of rings. In block 1705 a check is made to determine if all of the triplets have been used or computed. If all of the triplets of rings have been computed, then the process proceeds to element 1801 (process continues in FIG. 18). Otherwise, if the triplets have not been exhausted, the process continues to element 1707, where the angle between the vectors created by the triplet is computed. In one embodiment, equation [13] may be used to compute the angle between the two vectors. In block 1709 the angle between the two vectors and a threshold such as 10 degrees is checked. If the angle is greater than 10 degrees then a new triplet is selected in 1703. Otherwise, if the angle is less than 10 degrees the list H is checked to determine if it is empty in block 1715. If the list H is empty, then the process continues on to block 1713. In block 1713, R1, R2, and R3 (the current triplet selection) is added to the list H and the vector from the centroid of R1 to the centroid of R2 is associated to H, then the process continues on to block 1703 where the process selects another triplet. If the list H is not empty then the process continues on to block 1717. In block 1717, the angle between the already associated vector in H and the vector joining the centroid of R1 and the centroid of R2, of the current triple, is compared to a threshold, for example, 10 degrees. If this angle is less than a threshold, for example, 10 degrees then the process continues to block 1711. In block 1711 the current triple R1, R2, and R3 is added to the list H and the process continues to 1703 where another triple is selected. If the angle is greater than a threshold, for example, 10 degrees, then the list H is replaced by the list V in block 1719. The process continues again to block 1715 except the computation continues to be performed with respect to the list V. Referring back to block 1705 if the triples of rings have been exhausted then the process continues to block 1801 in FIG. 18. In block 1801 the lists H and V are checked to determine if they have one ring in common. If they do not have a ring in common then the process returns. If they do have a ring in common then the process continues on to block 1803. In block 1803 the lists H and V are checked to determine which has three rings. If neither H nor V have three rings then the process returns. Otherwise, if one of the lists contains three rings the process continues on to block 1805. In block 1805 the list that does not contain three rings is checked to determine if it contains four rings. If this list does not contain four rings then the process returns. Otherwise, if this list does contain four rings the process continues to block 1811. In block 1811 list H is checked to determine if it contains three rings. If H contains three rings then the lists H and V are swapped in block 1809 and then the process continues with block 1813. If the list H does not contain three rings then block 1813 is directly next. In block 1813 the list H is looped over and the (X,Y) coordinates of the pattern are associated to the rings in the list. For example, since H is the grid horizontal list the Coordinates have X ranging from X=0, −1, −2 . . . etc. and Y=0. In block 1815 the list V is looped over and the (X,Y) coordinates of the pattern are associated to the rings in the list. For example, since V is the grid vertical list the Coordinates have (X,Y) equal to (0,1) and (0,−1). In both blocks 1813 and 1815 the coordinates and their associated ring structures may, in one embodiment be stored in the data structures PatternCorrespondence (Table 5) and SortedPattern (Table 6).

Figure 19:
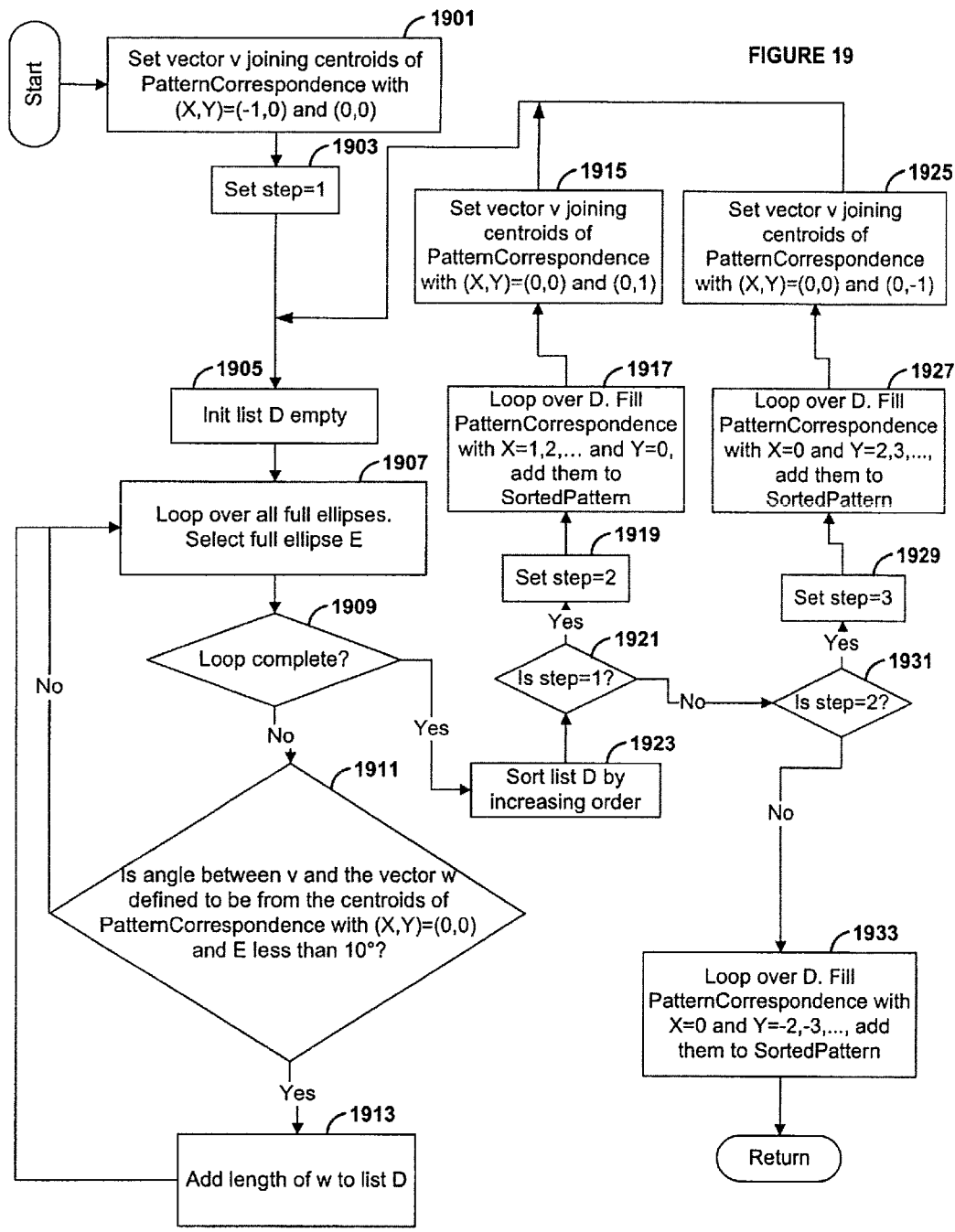
FIG. 19 is a logic flow diagram of a method for extending the grid horizontal and grid vertical directions in the image by adding full ellipses.

FIG. 19 is a process for extending the grid horizontal and grid vertical directions in the image by adding full ellipses. In some embodiments the process of FIG. 19 is used to perform the operations, functions, or methods of block 1503 of the process of FIG. 15. In block 1901 the centroids of PatternCorrespondence with (X,Y)=(−1,0) and (0,0) are set to be a vector named v, a horizontal right pointing vector, this is the reference vector or the vector that will be used to determine the angular alignment. In block 1903 a variable called step is set to the value 1. This variable keeps track of which elements of the process have been performed. For example, when the variable step=1 the process is involved in determining which full ellipses lie on the horizontal line to the right. In block 1905 a list called D is initialized as empty. The list D will eventually contain a list of lengths or magnitudes of vectors. In block 1907 a loop over all of the full ellipses is started. The currently selected full ellipse is referred to as ellipse E in this loop. A loop complete check is performed in block 1909. This check verifies whether all of the full ellipses have been looped through. If the loop is complete then the process continues to element 1923. Otherwise if the loop is not complete the process continues to element 1911. In block 1911 the angle between the vector v and the vector w formed by the centroid of the PatternCorrespondence with (X,Y)=(0,0) and the centroid of the current full ellipse E is computed. Equation [13] may be used to compute this angle. If the angle between vector v and vector w is less than 10 degrees or some other threshold, then block 1913 is next. Otherwise if the angle between vector v and vector w is greater than the threshold for example, 10 degrees, block 1907 is next where a new full ellipse E is selected. In block 1913 the length of the vector w is added to the list D. Once the loop is complete, block 1923 sorts the list D of lengths in increasing order. Next, is block 1921, the variable step is checked for its value. If the variable step is 1 then block 1919 is next. Otherwise, if the variable step is not 1 then block 1931 is next. In block 1919 the variable step is set to 2. For example, when the variable step=2 the process is involved in determining which full ellipses lie on the upward vertical axis. Block 1917 loops over the list D and fills the data structure PatternCorrespondence with X=1, 2, . . . and Y=0 and adds this information to the SortedPattern data structure. Process 1917 is simply assigning the appropriate (X,Y) coordinate values of the pattern in FIG. 6 to the ellipses from the image remaining in list D. At this point the horizontal right facing ellipses have been determined. In block 1915 the vector v is now set to be the vector joining the centroids of PatternCorrespondence with (X,Y)=(0,0) and (0,1), the vertical upward facing vector. Once again the list D is initialized to be empty in 1405. Then the loop beginning at block 1907 is entered again. However, this time the loop is computing for ellipses in the vertical upward direction. Once the loop is complete in block 1909 the list D is again sorted in 1923 by increasing length value. In element 1921, since the variable step is now 2 the process moves to element 1931. Since the variable step=2 element 1931 moves to element 1929 where the variable step is set to 3. This is the third and final direction that the process computes. This is the vertical downward facing direction. Block 1927 loops over the list D and fills the data structure PatternCorrespondence with X=0 and Y=2, 3, . . . and adds this information to the SortedPattern data structure. Process 1927 is simply assigning the appropriate (X,Y) coordinate values of the pattern in FIG. 6 to the ellipses from the image remaining in list D. At this point the vertical upward facing ellipses have been determined. In block 1925 the vector v is set to be the vector joining the centroids of PatternCorrespondence with (X,Y)=(0,0) and (0,−1), the vertical downward facing vector. Once again the list D is initialized to be empty in 1905. Then the loop beginning at block 1907 is entered again. However, this time the loop is computing for ellipses in the vertical downward direction. Once the loop is complete in block 1909 the list D is again sorted in 1923 by increasing length value. In element 1921, since the variable step is now 3 the process moves to element 1931. In element 1931 since the variable step=3 the process moves to element 1933. Block 1933 loops over the list D and fills the data structure PatternCorrespondence with X=0 and Y=−2, −3, . . . and adds this information to the SortedPattern data structure. Process 1933 is simply assigning the appropriate (X,Y) coordinate values of the pattern in FIG. 6 to the ellipses from the image remaining in list D. At this point the vertical downward facing ellipses have been determined.

Figure 20:
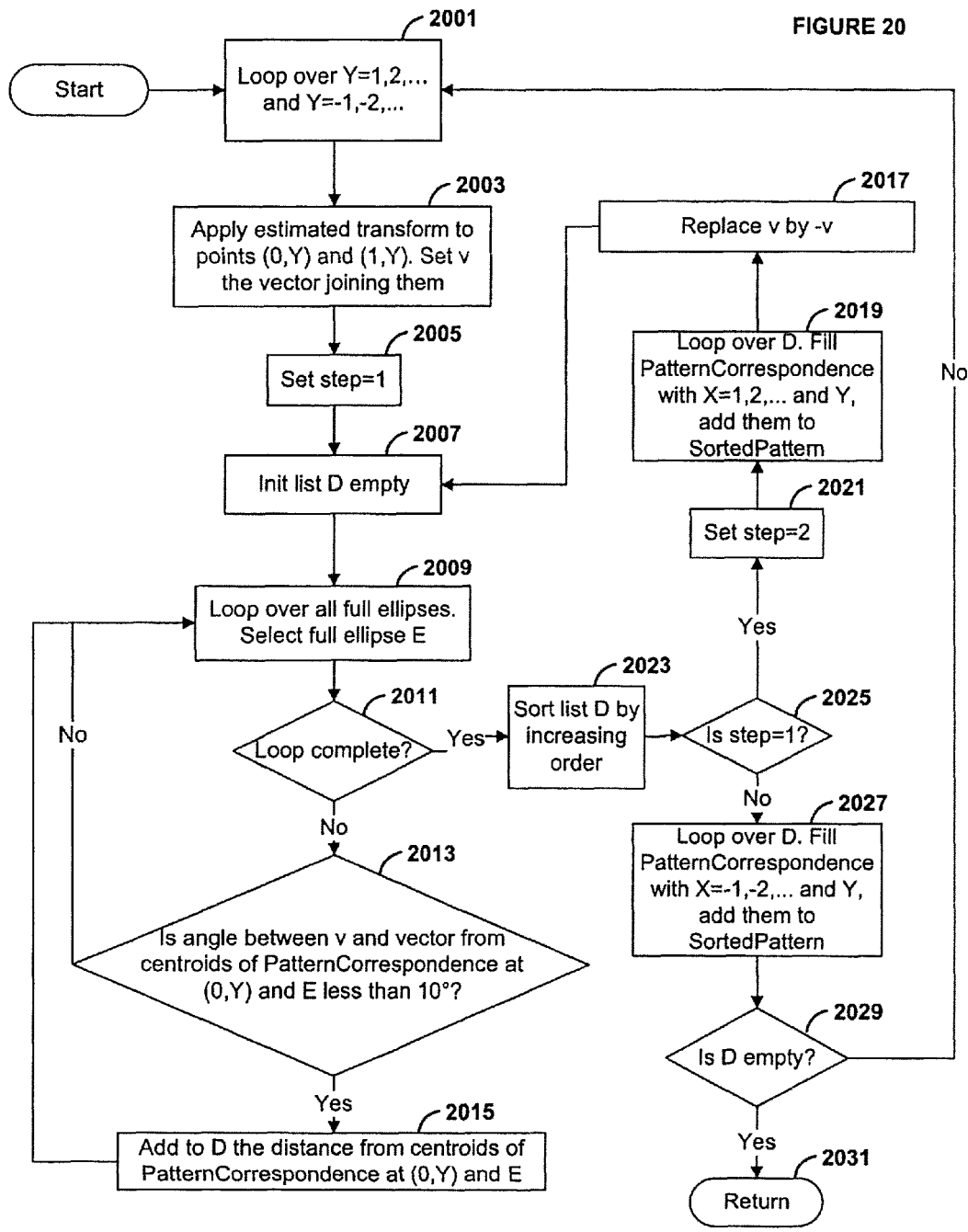
FIG. 20 is a logic flow diagram of a method for completing the entire grid of the image row by row.

FIG. 20 is a process for completing the entire grid of the image row by row. In some embodiments the process of FIG. 20 is used to perform the operations, functions, or methods of block 1507 of the process of FIG. 15. In block 2001 a loop is started over all of the rows, for example the rows defined by Y=1, 2, . . . and Y=−1, −2, . . . . The current row is referred to as Y. In block 2003 the estimated transform mapping is applied to the current values of the points (0,Y) and (1,Y). The vector v is defined to be the vector that joins these two points pointing in the direction from (0,Y) to (1,Y). In block 2005 the variable step is set to 1. This variable keeps track of which elements of the process have been performed. For example, when the variable step=1 the process is involved in determining which full ellipses lie to the right on row Y. In block 2007 the list D is initialized to be empty. The list D will eventually contain a list of lengths or magnitudes of vectors. In block 2009 a loop over all of the full ellipses is started. The currently selected full ellipse is referred to as ellipse E in this loop. A loop complete check is performed in block 2011. This check verifies whether all of the full ellipses have been looped through. If the loop is complete then the process continues to element 2023. Otherwise if the loop is not complete the process continues to element 2013. In block 2013 the angle between the vector v and the vector formed by the centroid of the PatternCorrespondence with (X,Y)=(0,Y) and the centroid of the current full ellipse E is computed. Equation [13] may be used to compute this angle. If the angle between vector v and the vector formed by the centroid of the PatternCorrespondence with (X,Y)=(0,Y) and the centroid of the current full ellipse E is less than 10 degrees or some other threshold, then block 2015 is next. Otherwise if the angle between vector v and the vector formed by the centroid of the PatternCorrespondence with (X,Y)=(0,Y) and the centroid of the current full ellipse E is greater than the threshold for example, 10 degrees, block 2009 is next where a new full ellipse E is selected. In block 2015 the distance from the centroids of the PatternCorrespondence at (0,Y) and E is added to the list D. Once the loop is complete, block 2023 sorts the list D of lengths in increasing order. In block 2025 the variable step is evaluated. If the value of step is 1 then block 2021 is next. Otherwise if the value of step is not 1 then block 2027 is next. In block 2021 the variable step is set to the value 2. Block 2019 loops over the list D and fills the data structure PatternCorrespondence with X=1, 2, . . . and Y and adds this information to the SortedPattern data structure. Process 2019 is simply assigning the appropriate (X,Y) coordinate values of the pattern in FIG. 6 to the ellipses from the image remaining in list D. At this point the horizontal right facing ellipses on row Y have been determined. In block 2017 the vector v is replaced with −v. This replacement will now allow the process to compute the ellipses that are positioned on the left side of row Y. Once again the list D is initialized to be empty in 2007. Then the loop beginning at block 2009 is entered again. However, this time the loop is computing for ellipses on the opposite side of the row. Once the loop is complete in block 2011 the list D is again sorted in 2023 by increasing length value. In block 2025 the value of step is checked. This time since step=2 the block 2027 is next. Block 2027 loops over the list D and fills the data structure PatternCorrespondence with X=−1, −2, . . . and Y and adds this information to the SortedPattern data structure. Process 2027 assigns the appropriate (X,Y) coordinate values of the pattern in FIG. 6 to the ellipses from the image remaining in list D. At this point the horizontal left facing ellipses on row Y have been determined. In block 2029 the list D is checked if empty. If the list D is empty then we return. Otherwise a new row is selected in block 2001 and the process repeats for the new row selection.

In another embodiment the methods described above may be used to insert images into live video or pre-recorded video. In this embodiment a pattern is first detected in the video, pre-recorded video or still image. The coordinates of four (4) points are determined from the pattern. Using the known four points compute the planar projective transform. Then, insert or embed an alternate image at the location of the pattern in the video, pre-recorded video, or still image. This technique may be used to insert advertising or other alternate images in live video, pre-recorded video, still photos or any type of image that may require an alternate image to be inserted.

Additionally, in another preferred embodiment, the 3-D orientation of the pattern with respect to the camera may be computed and tracked according to some of the techniques discussed above. In one embodiment, the camera is calibrated using the techniques above. For example, in some embodiments a pattern is detected. At least three (3) points are determined from the pattern. The 3-D location and 3-D orientation of the pattern with respect to the camera is completed, for example as is known in the art. Using the 3-D location and 3-D orientation information a full 3-D alternate image is inserted in place of the pattern. Also the 3-D location and orientation information may be constantly updated to perform dynamic 3-D tracking and kinematic 3-D computations.

The blocks presented above and below may utilize a method for keeping track of shapes and ellipses in the received image, their relationship to the pattern, and their properties. Table 2 below is one embodiment of a data structure for keeping track of shape information. For each shape in an image an array or table called ShapeInfo may be utilized. Table 2 may be stored in a memory for each shape. The value U is the horizontal coordinate of the centroid of the shape in the image measured in pixels. The value V is the vertical coordinate of the centroid of the shape in the image measured in pixels. The moments $I_{2,0}$, $I_{1,1}$, $I_{0,2}$ are the second order moments of the shape. The number of pixels is stored in the variable called area. The variable Upper indicates whether pixels at the interior boundary all have higher intensity than their outside neighbors or not. The variable Upper is expressed as a True or a False. The variable Siblings is a list of identifiers of siblings or other shapes sharing the same parent. The variable Parent is an identifier of the parent shape. The variable Children is a list of identifiers of children for this shape.

TABLE 2

ShapeInfo

U: horizontal coordinate of centroid in image (measured in pixels)
V: vertical coordinate of centroid in image (measured in pixels)
$I_{2,0}$: moment of the shape (a real number)
$I_{1,1}$: moment of the shape (a real number)
$I_{0,2}$: moment of the shape (a real number)
area: number of pixels
Upper: whether pixels at interior boundary all have higher intensity than their outside neighbors or not (true/false)
Siblings: list of identifiers of siblings (shapes sharing the same parent). These are indices in the list of shapes.
Parent: identifier of the parent shape (an index in the list).
Children: list of identifiers of children (the shapes for which this shape is the parent)

Table 3 below is one embodiment of a data structure for keeping track of ellipse information.

TABLE 3

EllipseInfo

U: horizontal coordinate of centroid in image (measured in pixels)
V: vertical coordinate of centroid in image (measured in pixels)
$I_{2,0}$: moment of the shape (a real number)
$I_{1,1}$: moment of the shape (a real number)
$I_{0,2}$: moment of the shape (a real number)
Ring: whether it is a full ellipse or a ring (true/false)

For each ellipse an array or table called EllipseInfo may be utilized. Table 3 may be stored in a memory for each ellipse. The variable U is the horizontal coordinate of the centroid of the ellipse in the image measured in pixels. The variable V is the vertical coordinate of the centroid of the ellipse in the image measured in pixels. The moments $I_{2,0}$, $I_{1,1}$, $I_{0,2}$ are the second order moments of the ellipse. The variable Ring indicates whether the ellipse is a full ellipse or a ring. The variable Ring can be True or False.

Table 4 below is one embodiment of a data structure for keeping track of the unsorted ellipses. Table 4 may be stored in a memory as a table or array of information.

TABLE 4

UnsortedPattern

| 1 | EllipseInfo: information concerning the ellipse first detected. |
| 2 | EllipseInfo: information concerning the ellipse detected next. |
| ... | |

The first ellipse detected according to the processes described below, in one embodiment may be referred to as EllipseInfo(1). The next ellipse detected may be referred to as EllipseInfo(2) etc. . . .

Table 5 below is one embodiment of a data structure for keeping track of the relationship between the ellipse in the image and the actual pattern, for example the pattern in FIG. 4.

TABLE 5

PatternCorrespondence

U: horizontal coordinate of a centroid of ellipse in image (in pixels)
V: vertical coordinate of a centroid of ellipse in image (in pixels)
X: horizontal coordinate in the ideal pattern (integer)
Y: vertical coordinate in the ideal pattern (integer)

The variable U is the horizontal coordinate of the centroid of the ellipse in the image measured in pixels. The variable V is the vertical coordinate of the centroid of the ellipse in the image measured in pixels. The variable X is the horizontal coordinate in the ideal pattern (for example the pattern in FIG. 4). Since the pattern in FIG. 4 is predetermined the variable X may be an integer. The variable Y is the vertical coordinate in the ideal pattern (for example the pattern in FIG. 4). Since the pattern in FIG. 4 is predetermined the variable Y may be an integer.

Table 6 below is one embodiment of a data structure for keeping track of the pattern correspondence or the sorted pattern.

TABLE 6

SortedPattern

| 1 | PatternCorrespondence: correspondence between image and ideal pattern |
| 2 | PatternCorrespondence: correspondence between image and ideal pattern |
| ... | |

Starting from a known position in the pattern of FIG. 4, for example the upper left hand corner of the pattern, the array SortedPattern may keep track of the correspondence of the ellipses and their corresponding circles in the ideal pattern. The first corresponding pair may be referred to as Pattern Correspondence(1). The second corresponding pair may be referred to as Pattern Correspondence(1) etc. . . .

Accordingly, methods and systems for performing and using image analysis, for example pattern recognition, camera calibration, and other matters, have been discussed. Although the invention has been described with respect to specific aspects and embodiments, it should be recognized that the invention may be practiced other than as specifically discussed, the invention comprising the claims and their insubstantial variations supported by this disclosure.

The invention claimed is:
1. A method for calibrating an optical device comprising:
   storing a plurality of images from an optical device in memory, each of the plurality of images including different views of an object with a pattern;
   detecting a pattern in an image of the plurality of images;
   estimating distortion parameters using information of the pattern;
   correcting distortion in at least some of the plurality of images;
   detecting the pattern in at least one of the corrected images; and
   estimating calibration parameters of the optical device.

2. The method of claim 1, wherein detecting a pattern in an image of the plurality of images comprises finding connected sets of pixels with similar values and determining if the connected sets of pixels meet a predefined criteria.

3. The method of claim 1, wherein estimating distortion parameters using information of the pattern comprises comparing expected positions of pixels in the pattern with detected positions of pixels of the pattern.

4. The method of claim 1, wherein estimating distortion parameters using information of the pattern comprises determining an initial projective transform map between pattern coordinates and image coordinates, initializing distortion parameters, and determining distortion parameters which provide a minimum error distance.

5. The method of claim 4, wherein the error difference is a function of distortion parameters and projective transform map between pattern coordinates and image coordinates.

6. The method of claim 1, wherein estimating calibration parameters of the optical device comprises initializing the calibration parameters, initializing rotations and translation information of relative positions of the optical device and pattern planes, and determining calibration parameters which provide a minimum error distance.

* * * * *

UNITED STATES PATENT AND TRADEMARK OFFICE
CERTIFICATE OF CORRECTION

PATENT NO. : 8,106,968 B1
APPLICATION NO. : 12/034596
DATED : January 31, 2012
INVENTOR(S) : Rudin et al.

It is certified that error appears in the above-identified patent and that said Letters Patent is hereby corrected as shown below:

In column 5, lines 28-30, delete "$U_{i,j} \binom{u}{v}_{i,j}{}'$" and insert --$U_{i,j} = \binom{u}{v}_{i,j}{}'$--, therefor.

In column 6, lines 59-60, delete "Levenber-Marquardt" and insert --Levenberg-Marquardt--, therefor.

In column 13, line 26, delete "$(T \div \sqrt{T^2 - 4D})/2$" and insert --$(T \pm \sqrt{T^2 - 4D})/2$--, therefor.

Signed and Sealed this
Nineteenth Day of June, 2012

David J. Kappos
*Director of the United States Patent and Trademark Office*